United States Patent
Simonovich et al.

(10) Patent No.: US 12,518,321 B2
(45) Date of Patent: Jan. 6, 2026

(54) USER INTERFACE ASSOCIATED WITH HOLISTIC DIGITAL CLAIMS PLATFORM

(71) Applicant: State Farm Mutual Automobile Insurance Company, Bloomington, IL (US)

(72) Inventors: William Simonovich, Sugar Hill, GA (US); Kenrick Niedbalski, Atlanta, GA (US); Sam Yeargin, Alpharetta, GA (US); Benjamin Tarmann, Heyworth, IL (US); Archy Ntabona, Lawrencevill, GA (US); Natalie Smith, Alpharetta, GA (US); Jared Musil, Roswell, GA (US); Deborah Taylor, Atlanta, GA (US); Mary Gonsalves, Normal, IL (US); Brittany Boyer, Roswell, GA (US); Jordan Leach, Atlanta, GA (US); Yohan Santos, Cumming, GA (US); Richard Kim, Alpharetta, GA (US); Loubna Fassi, Atlanta, GA (US); Abdul Wahab, Lilburn, GA (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 36 days.

(21) Appl. No.: 18/443,177

(22) Filed: Feb. 15, 2024

(65) Prior Publication Data
US 2024/0185359 A1    Jun. 6, 2024

Related U.S. Application Data

(63) Continuation of application No. 17/668,203, filed on Feb. 9, 2022, now Pat. No. 11,935,127.
(Continued)

(51) Int. Cl.
*G06Q 40/08* (2012.01)
*G06F 3/04842* (2022.01)
(Continued)

(52) U.S. Cl.
CPC ......... *G06Q 40/08* (2013.01); *G06F 3/04842* (2013.01); *G06Q 10/10* (2013.01); *H04L 67/02* (2013.01)

(58) Field of Classification Search
CPC ..... G06Q 40/08; G06Q 10/10; G06F 3/04842
(Continued)

(56) References Cited

U.S. PATENT DOCUMENTS 5,950,169 A   9/1999 Borghesi et al.
8,600,783 B2  12/2013 Smith et al.
(Continued)

FOREIGN PATENT DOCUMENTS

| WO | WO2011157064 A1 | 12/2011 |
| WO | WO2017124534 A1 | 7/2017 |
| WO | WO2021012891 | 1/2021 |

OTHER PUBLICATIONS

Office Action for U.S. Appl. No. 17/668,223, mailed on Dec. 27, 2024, Simonovich, "Holistic Digital Claims Platform Management", 34 pages.
(Continued)

*Primary Examiner* — Robert R Niquette
(74) *Attorney, Agent, or Firm* — Lee & Hayes, P.C.

(57) ABSTRACT

This technology relates to providing a web-based digital claims platform to provide users with a simple and customized experience when filing insurance claims. The platform is enabled by a plurality of back-end application programming interface (API) resources. These API resources are event-driven (e.g., when an "event" associated with the claim occurs, the status of the claim changes and the API is
(Continued)

provided with updated information indicative of the change). The platform includes a customized user interface (UI) that tailors the claim experience to a particular user's needs. The customization can be based off of stated user preferences and/or learned user preferences associated with the user's past behavior. A user can perform/request various services through the customized UI's self-service function (e.g., rent a car, find a hotel room, select a repair shop, etc.). Additionally, the customized UI can enable the user upload documents, track claim status, find relevant help topics, etc.

20 Claims, 10 Drawing Sheets

Related U.S. Application Data

(60) Provisional application No. 63/147,661, filed on Feb. 9, 2021.

(51) Int. Cl.
*G06Q 10/10* (2023.01)
*H04L 67/02* (2022.01)

(58) Field of Classification Search
USPC ............................................................ 705/4
See application file for complete search history.

(56) References Cited

U.S. PATENT DOCUMENTS

| | | | |
|---|---|---|---|
| 9,424,606 B2 | 8/2016 | Wilson, II et al. | |
| 9,773,281 B1 | 9/2017 | Hanson | |
| 9,846,911 B1 | 12/2017 | Burks et al. | |
| 9,916,625 B2 | 3/2018 | Lehman et al. | |
| 10,360,635 B2 | 7/2019 | Hanson et al. | |
| 10,387,960 B2 * | 8/2019 | Tofte | G06Q 10/06 |
| 10,467,701 B1 | 11/2019 | Corder et al. | |
| 10,585,955 B2 | 3/2020 | Wookey | |
| 10,902,525 B2 | 1/2021 | Kelsh et al. | |
| 11,120,497 B1 | 9/2021 | Schumann et al. | |
| 2001/0037224 A1 * | 11/2001 | Eldridge | G06Q 30/02 705/4 |
| 2002/0007289 A1 | 1/2002 | Malin et al. | |
| 2002/0035488 A1 | 3/2002 | Aquila et al. | |
| 2014/0114691 A1 | 4/2014 | Pearce | |
| 2015/0088557 A1 * | 3/2015 | Huynh | G06Q 10/10 705/4 |
| 2015/0154713 A1 | 6/2015 | Diaz | |
| 2016/0035038 A1 | 2/2016 | Perkins | |
| 2017/0220998 A1 | 8/2017 | Horn et al. | |
| 2017/0308652 A1 | 10/2017 | Ligon | |
| 2020/0402178 A1 | 12/2020 | Brandmaier et al. | |
| 2021/0035227 A1 * | 2/2021 | Pfister | G06Q 40/08 |
| 2021/0319458 A1 | 10/2021 | Vargas et al. | |
| 2022/0253943 A1 | 8/2022 | Simonovich et al. | |
| 2022/0270178 A1 | 8/2022 | Simonovich et al. | |
| 2023/0214936 A1 * | 7/2023 | Larson | G06Q 10/20 705/4 |

OTHER PUBLICATIONS

Office Action for U.S. Appl. No. 17/668,203, mailed on Jan. 9, 2023, Simonovich, "User Interface Associated With Holistic Digital Claims Platform", 16 Pages.

Office Action for U.S. Appl. No. 17/668,203, mailed on Apr. 21, 2023, Simonovich, "User Interface Associated With Holistic Digital Claims Platform", 20 Pages.

Office Action for U.S. Appl. No. 17/668,203, mailed on Aug. 4, 2023, William Simonovich, "User Interface Associated With Holistic Digital Claims Platform".

Office Action for U.S. Appl. No. 17/668,223, mailed on Apr. 26, 2023, Simonovich, "Holistic Digital Claims Platform Management", 20 pages.

Office Action for U.S. Appl. No. 17/668,223, mailed on Oct. 26, 2023, William Simonovich, "Holistic Digital Claims Platform Management", 25 pages.

Office Action for U.S. Appl. No. 17/668,223, mailed on Jun. 13, 2024, 30 pages.

* cited by examiner

USER INTERFACE ASSOCIATED WITH HOLISTIC DIGITAL CLAIMS PLATFORM

CROSS REFERENCE TO RELATED APPLICATIONS

This application claims priority to U.S. Utility application Ser. No. 17/668,203, filed Feb. 9, 2022, which claims priority to U.S. Provisional Patent Application No. 63/147,661, filed Feb. 9, 2021, the entire contents of which are incorporated herein by reference.

BACKGROUND

Traditionally, insurance claims have been generated manually by insurance adjusters while guiding customers through an extensive process of information and documentation gathering. However, in today's digital world, customers embracing smart technologies may prefer to expedite portions of the process. For instance, instead of scheduling and waiting for an adjuster to travel and take photos of a damaged car, most customers have smartphones that are capable of taking high resolution photos and videos. These customers can take photos and videos of not only a vehicle damage, but also of an accident scene following the incident, when details are fresh. With the ability to quickly send and receive data, e.g., via a smartphone, customer expectations for ease in filing and tracking claims have similarly increased. Customer expectations of an integrated experience that allows the customer to easily access information and services related to their claims have also increased.

Accordingly, there is a need for an intuitive and integrated digital claims platform that can guide customers and other users through the claims process. Since insurance claims are usually filed during difficult times, often involving loss of property, there is a need to provide excellent service and timely results to people experiencing these losses.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

SUMMARY

Figure 1:
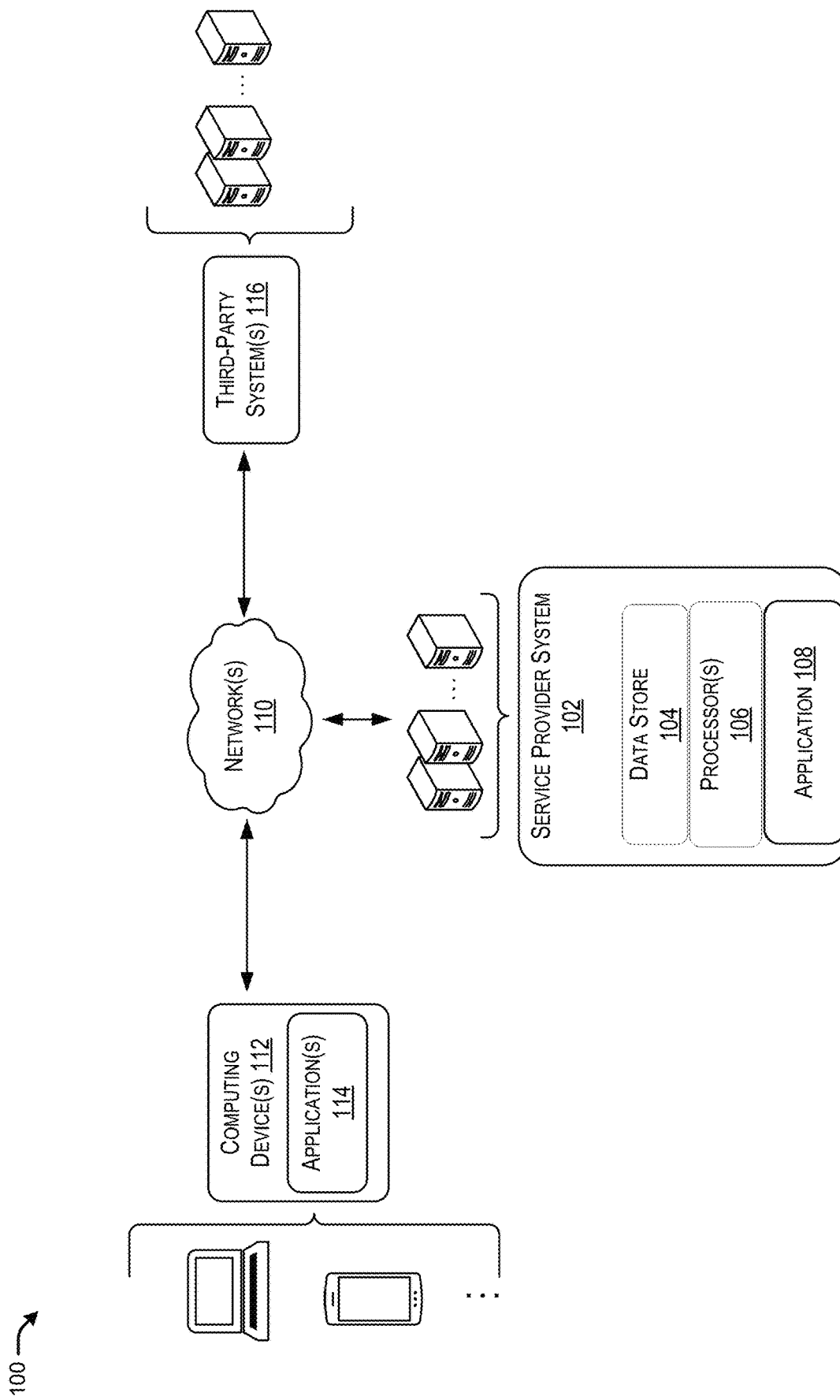
FIG. 1 is a schematic view of an example system usable to implement an architecture for a holistic digital claims platform.

In some examples, the present disclosure describes a system comprising one or more processors and computer-readable media storing computer readable instructions that, when executed by the one or more processors, cause the one or more processors to perform operations comprising receiving a user identifier via a network; presenting, based on the user identifier, a user interface of a digital claims platform; receiving, via the user interface, a first input indicating an occurrence of an event; associating the first input with the user identifier; receiving, via the user interface, a second input including a first request to present user information, wherein the first request indicates the user identifier; generating, based at least in part on the second input, an updated user interface including information associated with the first input and the event; and presenting the updated user interface via a device.

In some embodiments, the present disclosure describes a method comprising receiving a user identifier via a network; presenting, based on the user identifier, a user interface of a digital claims platform; receiving, via the user interface, a first input indicating an occurrence of an event; associating the first input with the user identifier; receiving, via the user interface, a second input including a first request to present user information, wherein the first request indicates the user identifier; generating, based at least in part on the second input, an updated user interface including information associated with the first input and the event; and presenting the updated user interface via a device.

In some embodiments, the present disclosure describes one or more non-transitory computer-readable media of an entity. The one or more non-transitory computer-readable media may store instructions that, when executed by one or more processors of a computing device, cause the computing device to perform operations comprising receiving a user identifier via a network; presenting, based on the user identifier, a user interface of a digital claims platform; receiving, via the user interface, first input including first information associated with a first event; associating the first input with the user identifier; receiving, from an application programming interface (API), a second input including second information associated with a second event; associating the second input with the user identifier; receiving, via the user interface, a third input including a first request to present user information, wherein the first request indicates the user identifier; generating, based at least in part on the third input, an updated user interface including the first information and the second information, wherein the first information is displayed in a first location on the updated user interface and the second information is displayed in a second location on the updated user interface; and presenting the updated user interface via a device.

DETAILED DESCRIPTION

This disclosure is directed to a holistic digital claims platform that provides an integrated, intuitive, and customized user interface to intelligently guide a user through the claims process. In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS."). Any or all of the foregoing examples may be implemented alone or in combination with any one or more of the other examples.

FIG. 1 illustrates an example system 100 for implementing a holistic digital claims platform, as described herein. In some examples, the system 100 can include a service provider system 102 configured for use by an insurance service provider, a business organization, or by any other service provider. The service provider system 102 may provide computing resources for the digital claims platform, and such computing resources may enable real-time detection of events associated with a claim as described herein. The service provider system 102 may include one or more servers or other computing devices, any or all of which may include one or more processors and memory storing computer executable instructions to implement the functionality discussed herein attributable to the digital platform associated with the service provider system 102.

As shown in FIG. 1, the service provider system 102 may comprise a data store 104, one or more processors 106, and/or an application 108. The data store 104 may comprise computer-readable media. In some examples, the computer-readable media can be used to store any number of functional components that are executable by the processors 106. In many implementations, these functional components comprise instructions or programs that are executable by the processors and that, when executed, configure the processors 106 to perform the actions attributed above to the service provider system 102. The computer-readable media may include non-transitory computer-readable storage media, which may include hard drives, floppy diskettes, optical disks, DVDs, read-only memories (ROMs), random access memories (RAMs), CD-ROMs, erasable programmable read-only memory (EPROMs), electrically erasable programmable read-only memory (EEPROMs), flash memory, magnetic or optical cards, solid-state memory devices, or other types of storage media appropriate for storing electronic instructions. In addition, in some examples the computer-readable media may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. In some examples, the entity represents an insurance service provider.

Processors 106 can represent a single processing unit or a number of processing units, and can include single or multiple computing units or multiple processing cores. The processors 106 can be implemented as one or more microprocessors, microcomputers, microcontrollers, digital signal processors, central processing units, state machines, logic circuitries, and/or any devices that manipulate signals based on operational instructions. For example, the processors 106 can be one or more hardware processors and/or logic circuits of any suitable type specifically programmed or configured to execute the algorithms and processes described herein. The processors 106 can be configured to fetch and execute computer-readable instructions stored in the computer-readable media, which can program the processors 112 to perform the functions described herein.

As used herein, "application" 108 may refer to any set of computer-readable instructions that enable communication between users (e.g., sender and recipient of a message, employee of a company, organization, etc.) of a digital platform (e.g., service provider system 102) over a wired or wireless communications network 110. In some examples, the application 108 may comprise a web browser (e.g., Microsoft Windows Internet Explorer®, Mozilla Firefox®, Apple Safari®, Google Chrome™, Opera, etc.) or a native or special-purpose client application (e.g., social media applications, messaging applications, email applications, games, etc.), to access and communicate content over the network 110. Accordingly, by providing an integrated digital platform, the system 100 described herein provides a dynamic and intuitive guided user experience.

The network 110 may represent a single network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing device 112 may access the service provider system 102 and/or communicate with third-party system(s) 116.

Computing devices 112 may include one or more processors and memory storing computer executable instructions to implement the functionality discussed herein attributable to the various computing devices. In some examples, computing devices 112 may include one or more desktop computers, laptop computers, tablet computers, mobile devices (e.g., smart phones or other cellular or mobile phones, mobile gaming devices, portable media devices, etc.), or other suitable computing devices. The computing devices 112 may execute an application 114. Application 114 may refer to any set of computer-readable instructions that enable communication between users (e.g., sender and recipient of a message, employee of a company, organization, etc.) of a digital platform (e.g., service provider system 102) over a wired or wireless communications network 110. In some examples, the application 114 may comprise a web browser (e.g., Microsoft Windows Internet Explorer®, Mozilla Firefox®, Apple Safari®, Google Chrome™, Opera, etc.) or a native or special-purpose client application (e.g., social media applications, messaging applications, email applications, games, etc.), to access and communicate content over the network 110. Accordingly, by providing an integrated digital platform, the system 100 described herein provides a dynamic and intuitive guided user experience.

The third-party system 116 may represent a single network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the third-party system 116 may communicate with the service provider system 102 and/or communicate with the application 108 and application 114. Accordingly, FIG. 1 illustrates an example system 100 for implementing a holistic and integrated digital claims platform, as described herein.

FIGS. 2-5 illustrate schematic views showing example dynamic user interfaces that are usable to implement the techniques described herein. The interfaces described herein may be based on one or more templates generated by a computing device of a social networking system (e.g., social networking system 106) and transmitted to one or more user computing devices (e.g., computing devices 104) for presentation. Additionally or alternatively, the interfaces described herein may be generated by the one or more user computing devices based at least in part on instructions received from the social networking system. As discussed above, the interfaces described herein may, but need not, be implemented in the context of the system 100.

Figure 2A:
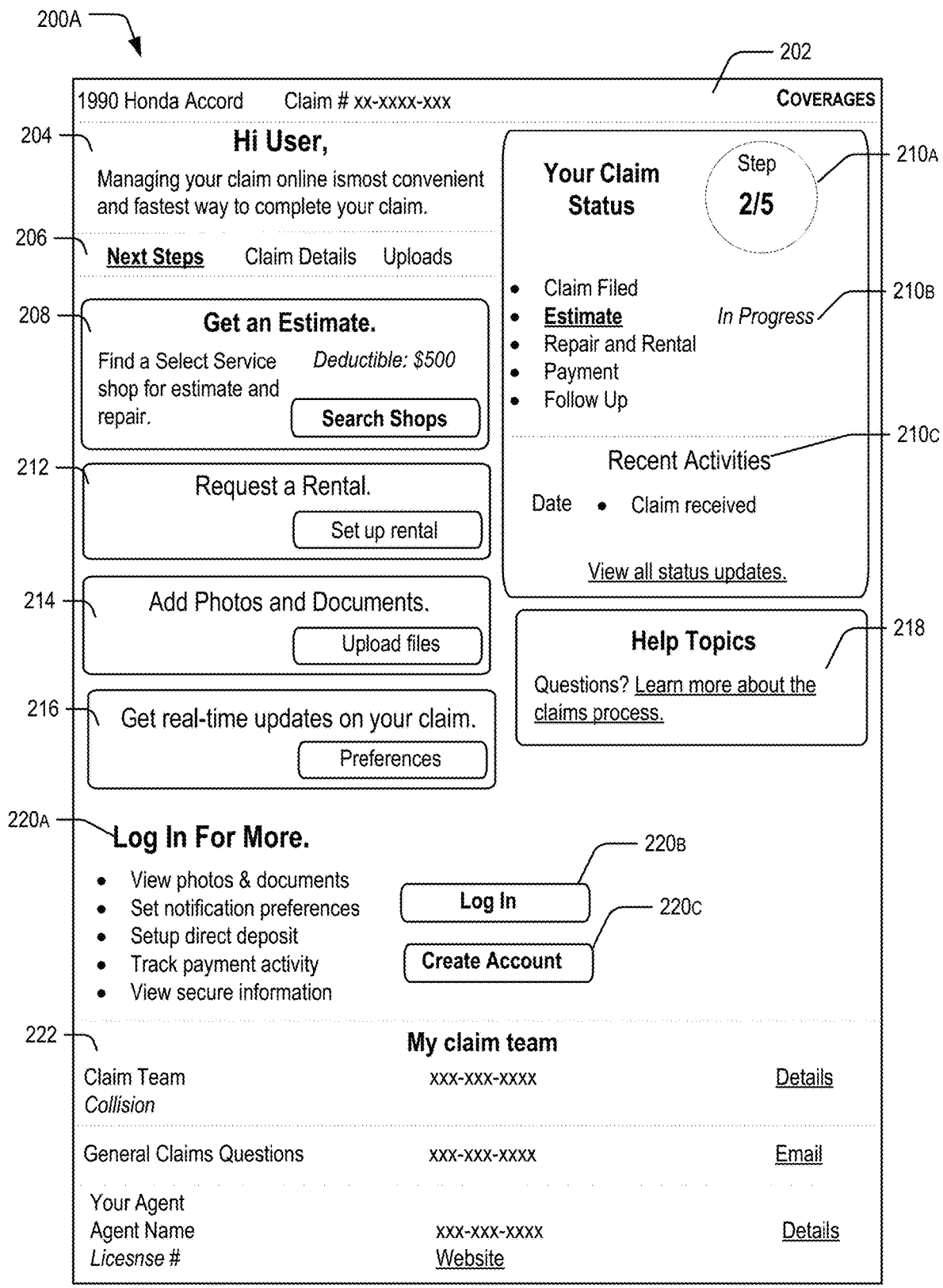
FIGS. 2A and 2B illustrate an example user interface in accordance with some examples of the present disclosure.

FIG. 2A illustrates an example dynamic user interface 200a in accordance with some embodiments of the present disclosure. In some examples, the user interface 200a corresponds to an example interface of the application 114 on a computing device (e.g., computing device 112) associated with a user, which is displayed when the user initially accesses the digital claims platform and has not logged into a user account associated with the service provider system 102. As an example, the service provider system 102 can generate a uniform resource locator (URL), that is provided to the user (e.g., via text, email, etc.) by the service provider system 102 and/or a third-party system 116. The user can select the URL and the processors 106 receive the user's selection as input. In response, the processors 106 can cause user interface 200a to be displayed. The URL can comprise information associated with the user (e.g., claim ID, user ID, whether the user has an insurance policy associated with the service provider system, etc.), that the processors 106 can use to provide a customized user interface. Additionally, the URL comprises a security token that includes an indication that the user has not logged into a user account associated with the service provider system 102. In some examples, the security token can correspond to an authentication level. For instance, if the user has not logged into a user account associated with the service provider system 102, the security token can be associated with a first authentication level (e.g., indicating the user has not been fully authenticated). The processors 106 can determine, based on the first authentication level, that sensitive information (e.g., claim estimates, payment information, uploaded files, documents, etc.) associated with the user should not be included for display on user interface 200a. When the user logs into an account associated with the service provider system 102 (or creates an account associated with the service provider system 102), a security token can be generated. This security token can be associated with a second authentication level (e.g., indicating the user is fully authenticated). The processors 106 can receive the security token associated with the second authentication level as input and cause a user interface to be displayed, such as user interface 300, described in greater detail below. In some examples, the security token associated with the first authentication level is different from (e.g., comprises different characters, numbers, symbols, etc.) the security token associated with the second authentication level. Accordingly, the digital claims platform can utilize the security token to intelligently provide a personalized cohesive user experience, while still protecting sensitive user information.

User interface 200a may display claim information 202, that is particular to the user. In some examples, the user interface 200a includes a welcome message 204 that is particular to the user. Welcome message 204 can additionally or alternatively be customized based on what step and/or stage of a claim process is currently associated with the user. In some examples, the claim information 202 and/or welcome message 204 can be personalized based on user information associated with the user. For instance, as shown in FIG. 2A, claim information 202 includes an indication of the claim (e.g., claim number and claim type) associated with the user and the year, model, and make of the user's vehicle. Additionally, the welcome message 204 can include a personalized greeting that includes an identifier of the user (e.g., name, username, etc.). In some examples, the user information can be associated with a user account of the user and can be stored in the data store 104.

User interface 200a may include selectable fields 206. In some examples, the selectable fields 206 may correspond to "next steps," "claim details," and/or "uploads." For instance, the user can select "next steps." In response to the user's selection, the processors 106 can cause the user interface to display one or more options (e.g., interface elements 208, 212, 214, 216). In some examples, the one or more options are customized based on where the user is in the claims process. Additionally or alternatively, the one or more options can be customized based on the type of claim the user is filing. For instance, the one or more options displayed for an automobile insurance claim may be different from the one or more options displayed for a fire insurance claim, a home insurance claims, and/or a rental insurance claim. As used herein, unless otherwise indicated, the term "select" or "selection" means a touch, a force touch, a multi-touch, a swipe in any direction, a voice input, a mouse input, a stylus input, or any other input designed to interact with a user interface control.

In some examples, the user can select "claim details," which can be provided as input to the processors 106. In response to the user's selection, the processors 106 cause the user interface to display current activities associated with the user's claims.

As an example, if the user has scheduled activities associated with a claim (e.g., repair of an automobile, rental, hotel stay, etc.), activity information associated with each activity will be displayed when the user selects "claim details." In some examples, the activity information is selectable by the user to make changes to the activity. For instance, where the activity information corresponds to a scheduled automobile repair, the activity information may include a selectable link that the user can select to make changes to a location, date, time, etc. of the repair. If the activities associated with the claim have been completed, the user interface may display an activity message indicating there is no activity information to currently display.

In some examples, the user can select "uploads," which can be provided to the processors 106 as input. In response to the user's selection, the processors 106 cause the user interface to display an interface element that the user can select to upload one or more files (e.g., documents, photos, etc.). In some examples, the uploaded files are stored in the data store 104. In some examples, uploaded files are not viewable by the user unless the user is logged into a user account associated with the service provider system 102. In this way, the digital claims platform enables users to provide information pertinent to the claims process, while still protecting sensitive user information.

User interface 200a may include status elements 210a-210c, which correspond to information related to the user's claim status. In some examples, the status elements 210a-210c are rendered based on a pre-defined template. In some examples, a first status element 210a and a second status element 210b correspond to visual representations of where the user's claim is in the claim process. For instance, the second status element 210b may include one or more steps in a claim process (e.g., claim filed, estimate, repair and rental, payment, and/or follow up). In some examples, the second status element 210b may include one or more visual indicia of emphasis (e.g., highlight, underline, bold, italicize, change color, etc.) associated with one of the steps in the claim process to visually indicate which step is currently associated with the user's claim. As an example, the second status element 210b may include a bolded and underlined "estimate" step, as shown in user interface 200a. The second status element 210b may additionally include text indicating which step is "in progress," as shown in user interface 200a.

In some examples, a third status element 210c corresponds to status information related to recent activities associated with the user's claim. For instance, the third status element 210c may display a date and an associated claim event (e.g., the user filed a claim, the user selected a repair shop, a claim estimate was received, a payment was made, etc.). In some examples, the amount of information displayed by the third status element 210c may be dependent on the user's authentication level. As an example, if the user has not logged into the digital claims platform, the third status element 210c may display a date and an indication that a payment was made, however, additional information (e.g., who the payment was made by, an amount of the payment, etc.) may not be shown until the user logs into a user account associated with the service provider system 102.

In some examples, status elements 210a-210c are dynamic and are updated in real-time based on information the service provider system 102 receives in relation to the user's claim. As an example, the service provider system 102 may receive new information related to the user's claim. In some examples, the new information may be received from a claim handler and/or a third-party system 116 (e.g., repair shop, rental, hotel, etc.). In some examples, the new information may be received by the service provider system 102 from a first API associated with the third-party system and/or a second API associated with the claim handler. In some examples, the claim handler corresponds to an insurance agent assigned to the user's claim. In this way, the digital claims platform is able to provide a dynamic user interface that can be updated based on relevant, new information in real-time.

In some examples, user interface 200a includes a first interface element 208, associated with obtaining a claim estimate. In some examples, the first interface element 208 is displayed based on what stage of the claims process is currently associated with the user. As an example, the first interface element 208 can be displayed when the user is at the "estimate" stage of the claim process. In some examples, the first interface element 208 may include one or more visual indicia of emphasis. For instance, the first interface element 208 may comprise text that is bolded, highlighted, or otherwise emphasized to indicate that the first interface element 208 corresponds to the stage of the claims process that is currently associated with the user.

In some examples, the first interface element 208 includes a selectable control that can be selected by the user. The processors 106 receive the user's selection as input and, in response, causes the user interface 200a to display an option for the user to select a first service (e.g., receive an estimate, select a repair shop, etc.) related to obtaining the claim estimate. As an example, where the claim filed corresponds to an automobile insurance claim, the selectable control of the first interface element 208 can be selected by the user and provided as input to the processors 106. In response to the user's selection, the processors 106 can cause the user interface 200a to display option(s) for the user to search for and/or select a repair shop to receive a claim estimate from. In some examples, the first interface element 208 may also include an indication of the user's deductible as it relates to the insurance claim. In this way, the digital claims platform provides an integrated and cohesive user interface, that is personalized to the user.

In some examples, user interface 200a includes a second interface element 212. In some examples, the second interface element 212 is selectable by the user and allows the user to request a second service (e.g., an automobile rental, hotel room reservation, etc.) related to the user's insurance claim. In some examples, the second interface element 212 includes a selectable control that can be selected by the user. The processors 106 receive the user's selection as input and, in response, causes the user interface 200a to display an option for selecting a service related to obtaining the claim estimate. As an example, where the claim filed comprises an automobile insurance claim, the selectable control of the second interface element 208 may allow the user to search for, select, and/or reserve a rental car. In some examples, the second interface element 208 can be displayed based on the user's insurance policy. As an example, if the user's automobile insurance policy does not include coverage for a rental car, the second interface element 212 may not be displayed. In this way, the digital claim platform provides an integrated claims experience, such that user is provided with a holistic user experience that is customized for the specific user.

In some examples, user interface 200a includes a third interface element 214. In some examples, the third interface element 214 includes a selectable control that can be selected by the user. The processors 106 receive the user's selection as input and, in response, can cause the user interface 200a to display an option for the user to upload one or more files (e.g., documents, photos, etc.). The uploaded files can be stored by the processors 106 in the data store 104. In some examples, uploaded files are not viewable by the user unless the user is logged into a user account associated with the service provider system 102. In this way, the digital claims platform enables users to provide information pertinent to the claims process, while still protecting sensitive user information.

In some examples, user interface 200a includes a fourth interface element 216. In some examples, the fourth interface element 216 includes a selectable control that can be selected by the user. The processors 106 receive the user's selection as input and, in response, can cause the user interface 200a to display an option for the user to access, set, and/or update one or more user preferences. Additionally or alternatively, the selectable control of the fourth interface element 216 can be selected by the user to access, set, and/or modify preferences associated with an identifier of the user. In some examples, the identifier of the user can be stored in data store 104. Additionally or alternatively, the identifier can be associated with a corresponding user account of the user.

In some examples, the user preferences are stored in the data store 104 and associated with a user account of the user. In some examples, limited user preferences are displayed if the user is not logged into a user account associated with the service provider system 102. As an example, if the user is not logged into the user account, limited user preferences may be displayed, accessed, and/or updated by the user via the selectable control of the fourth interface element. For instance, in this example, the user may be able to set communication preferences, such as selecting whether to receive email and/or text notifications from service provider system 102. In other examples, the user may be able to view current communication preferences regarding receiving email and/or text notifications from the service provider system 102, but may be required to log into an associated user account in order to modify the communication preferences.

User interface 200a may also include a linked element 218 (in this case, denoted by "Learn more about the claims process") that is selectable by the user to provide the user with additional information about the claims process. In some examples, the linked element 218 can be updated to reflect topics associated with where the user is in the claims process. As an example and not by way of limitation, if the user is at the "repair and rental" stage of filing a claim, linked element 218 may display one or more topics corresponding to help topics specific to the "repair and rental" stage of filing the claim. Accordingly, the user interface can be customized such that the user is provided with information pertinent to the current stage of the claims process that is associated with the user. This provides the user with a more guided and intuitive user experience.

User interface 200a may also include account elements 220a-220c. In some examples, a first account element 220a may indicate a user has not logged into an account associated with the service provider system 102. In some examples, the first account element 220a may also include information associated with actions the user is able to take by logging into the user's account. As an example, logging into the user's account may enable the user to perform actions including viewing uploaded files, setting notification preferences, setting other preferences, modifying notification and/or other preferences, setting up direct deposit, tracking payment activity, and/or viewing secure information associated with the user. In some examples, a second account element 220b corresponds to a selectable control that can be selected by the user. The processors 106 receive the user's selection as input and, in response, can cause the user interface 200a to display an option for the user to log into a user account by providing security information (e.g., a username, password, etc.). In some examples, a third account element 220c corresponds to a selectable control that can be selected by the user. The processors 106 receive the user's selection as input and, in response, can cause the user interface 200a to display an option for the user to create a user account with the service provider system 102.

User interface 200a may also include claim team information 222. In some examples, the claims team information 222 may include one or more of agent (e.g., claim handler) name(s), agent phone number(s), agent license number(s), agent website(s), team(s) assigned to handle the claim, team phone number(s), team website(s), general question email, etc. Accordingly, the user is provided with a holistic user interface that is tailored to the particular user and provides and integrated and intuitive user experience.

Figure 2B:
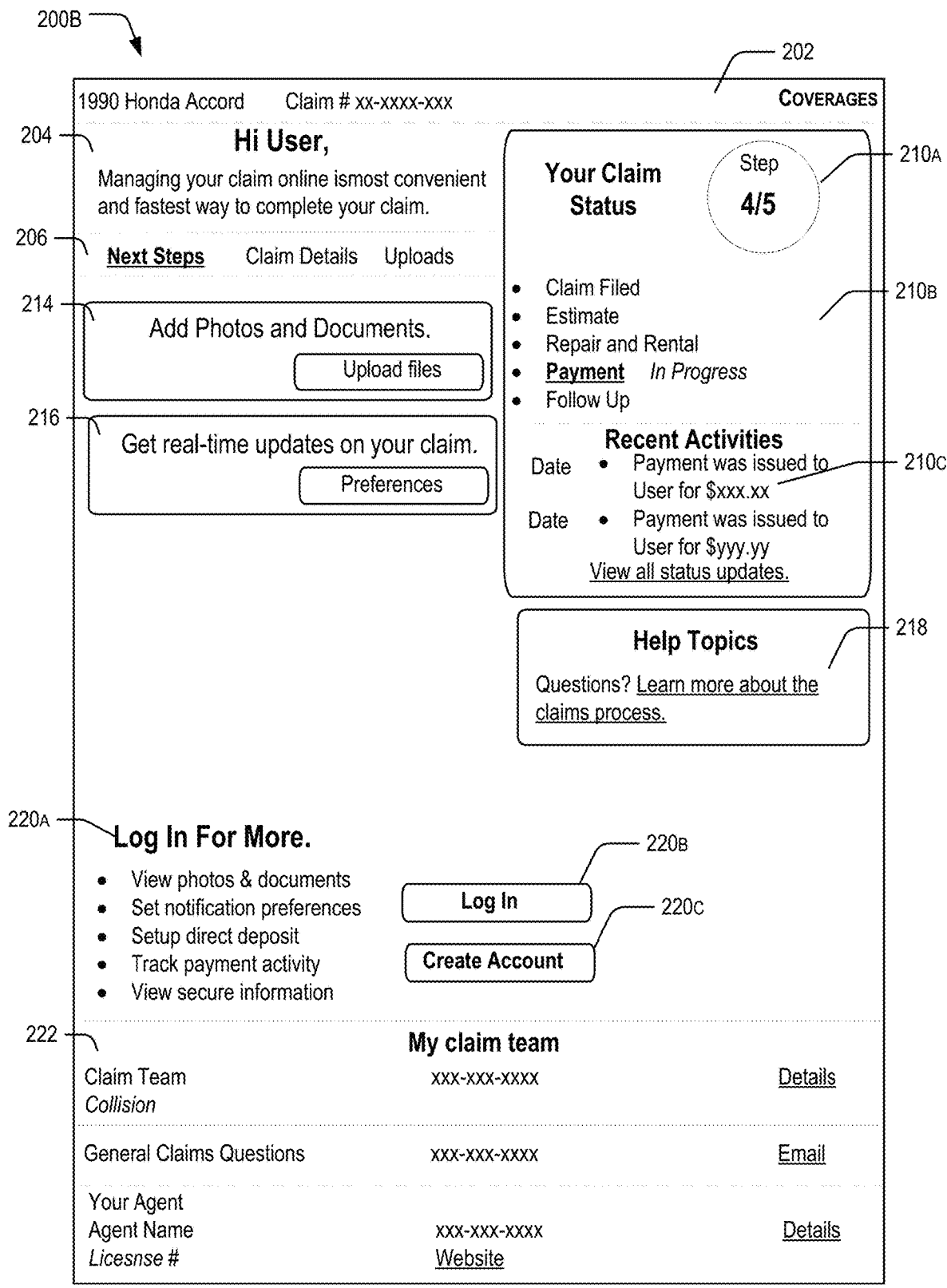

FIG. 2B illustrates an example dynamic user interface 200b in accordance with some embodiments of the present disclosure. In some examples, user interface 200b corresponds to user interface 200a that has been updated. For instance, service provider system 102 may receive new information associated with a user's claim from one or more sources (e.g., third-party system(s), claim handlers, etc.). In this example, the service provider system 102 may store the new information in data store 104 in association with a user identifier of the user and/or a user account associated with the payment service provider 102. For instance, the new information may correspond to one or more activities associated with a claim that have been completed by the user and/or an indication that a repair and/or rental service has been completed in association with the user's claim. Accordingly, upon rendering user interface 200b, the new information may be displayed on the updated user interface. In some examples, the new information may be displayed upon the user reloading the user interface 200b. Additionally or alternatively, the service provider system 102 may detect the receipt of new information in real-time and cause the user interface 200b to display the new information.

User interface 200b may include claim information 202, that is personalized to the user. In some examples, user interface 200a includes a welcome message 204 that is personalized to the user. In some examples, welcome message 204 can be customized based on what step and/or stage of a claim process is currently associated with the user. In some examples the claim information 202 and/or welcome message 204 can be personalized based on user information associated with the user. In some examples, the user information can be associated with a user account of the user. In some examples, the user information can be stored in the data store 104.

User interface 200b may include selectable fields 206. In some examples, the selectable fields 206 may correspond to "next steps," "claim details," and/or "uploads." In some examples, the user selecting "next steps" can cause the user interface to display one or more options (e.g., interface elements 214 and/or 216). As discussed above with regard to FIG. 2A, the one or more options are customized based on where the user is in the claims process. Additionally or alternatively, the one or more options are customized based on the type of claim the user is filing. For instance, the one or more options displayed for an automobile insurance claim may be different from the one or more options displayed for a fire insurance claim, a home insurance claims, and/or a rental insurance claim. In this way, the digital claim platform provides a user interface that is customized for the specific user.

In some examples, the user can select "claim details." The processors 106 can receive the user's selection as input and, in response, cause the user interface 200b to display current activities associated with the user's claims, as described above with regard to FIG. 2A. In some examples, the user can select "uploads." The processors 106 receive the user's selection as input and, in response, can cause the user interface 200b to display an interface element that enables the user to upload one or more files (e.g., documents, photos, etc.), as described above with regard to FIG. 2A.

User interface 200b may include status elements 210a-210c, which correspond to information related to the user's claim status. In some examples, a first status element 210a and a second status element 210b correspond to visual representations of where the user's claim is in the claim process. In some examples, the second status element 210b may include one or more steps in a claim process (e.g., claim files, estimate, repair and rental, payment, and/or follow up). In some examples, the second status element 210b may include one or more visual indicia of emphasis (e.g., highlight, underline, bold, italicize, change color, etc.) associated with one of the steps in the claim process to visually indicate which step currently is associated with the user's claim. As an example, the second status element 210b may include a visual indicia, such as text that is bolded and underlined (e.g., the "payment" step), as shown in user interface 200a. The second status element 210b may additionally include text indicating which step is "in progress," as shown in user interface 200a.

In some examples, a third status element 210c corresponds to status information related to recent activities associated with the user's claim. For instance, the third status element 210c may display a date and an associated claim event (e.g., the user filed a claim, the user selected a repair shop, a claim estimate was received, a payment was made, etc.). In some examples, the amount of information displayed by the third status element 210c may be dependent on the user's authentication level. As an example, if the user has not logged into the digital claims platform, the third status element 210c may display a date and an indication that a payment was made, however, additional information (e.g., who the payment was made by, an amount of the payment, etc.) may not be shown until the user logs into a user account associated with the service provider system 102. That is, the digital claims platform provides an integrated and dynamic user interface, such that the user is provided with a holistic, personalized, and guided user experience.

As shown in user interface 200b, the first status element 210a, the second status element 210b, and/or the third status element 210c can be updated based on new information received by the service provider system 102. As an example, upon receiving new information associated with the user's claim, the service provider system 102 can determine that the user has moved from the "estimate" stage of the claims process to the "payment" stage of the claims process. For instance, the new information may comprise an indication that the user has received a claim estimate and completed any scheduled services associated with the claim (e.g., repairs, rentals, etc.). In this example, the service provider system 102 can then render user interface 200b to display the first status element 210a, updated to indicate the user is now on "step 4/5" in the claims process, the second status element 210b, updated to include a visual indicia of emphasis that the "payment" step in the claim process is currently "in progress," and the third status element 210c, updated to indicate recent activities associated with the user's claim.

In some examples, status elements 210a-210c can be updated dynamically and may be updated in real-time based on new information the service provider system 102 receives in relation to the user's claim. In some examples, the new information may be received from a claim handler and/or a third-party system 116 (e.g., repair shop, rental, hotel, etc.). In some examples, the new information may be received by the service provider system 102 from a first API associated with the third-party system and/or a second API associated with the claim handler. In some examples, the claim handler corresponds to an insurance agent assigned to the user's claim. Accordingly, the user interface can be dynamically updated to provide the user with new information in real-time, such that user is provided with a guided and customized user experience.

User interface 200b may also include one or more linked element(s) 218 (in this case, denoted by "Learn more about the claims process") that is selectable by the user to provide the user with additional information about the claims process. In some examples, the linked element 218 can be updated to reflect topics associated with where the user is in the claims process. As an example and not by way of limitation, if the user is at the "payment" stage of filing a claim, linked element(s) 218 may display one or more topics (e.g., questions and answers) corresponding to help topics specific to the "payment" stage of filing the claim. Accordingly, the user interface can be customized such that the user is provided with information pertinent to the current stage of the claims process that is associated with the user. This provides the user with a more guided and intuitive user experience.

User interface 200b may also include account elements 220a-220c. In some examples, a first account element 220a may indicate a user has not logged into an account associated with the service provider system 102. In some examples, the first account element 220a may also include information associated with actions the user is able to take by logging into the user's account. As an example, logging into the user's account may enable to the user perform actions including viewing uploaded files, setting notification preferences, setting other preferences, modifying notification and/or other preferences, setting up direct deposit, tracking payment activity, and/or viewing secure information associated with the user. In some examples, a second account element 220b corresponds to a selectable control that can be selected by the user. The processors 106 receive the user's selection as input and, in response, can cause the user interface 200b to display an option for the user to log into a user account by providing security information (e.g., a username, password, etc.). In some examples, a third account element 220c corresponds to a selectable control that can be selected by the user. The processors 106 receive the user's selection as input and, in response, can cause the user interface 200b to display an option for the user to create a user account with the service provider system 102.

User interface 200b may also include claim team information 222. In some examples, the claims team information 222 may include one or more of agent (e.g., claim handler) name(s), agent phone number(s), agent license number(s), agent website(s), team(s) assigned to handle the claim, team phone number(s), team website(s), general question email, etc.

Figure 3:
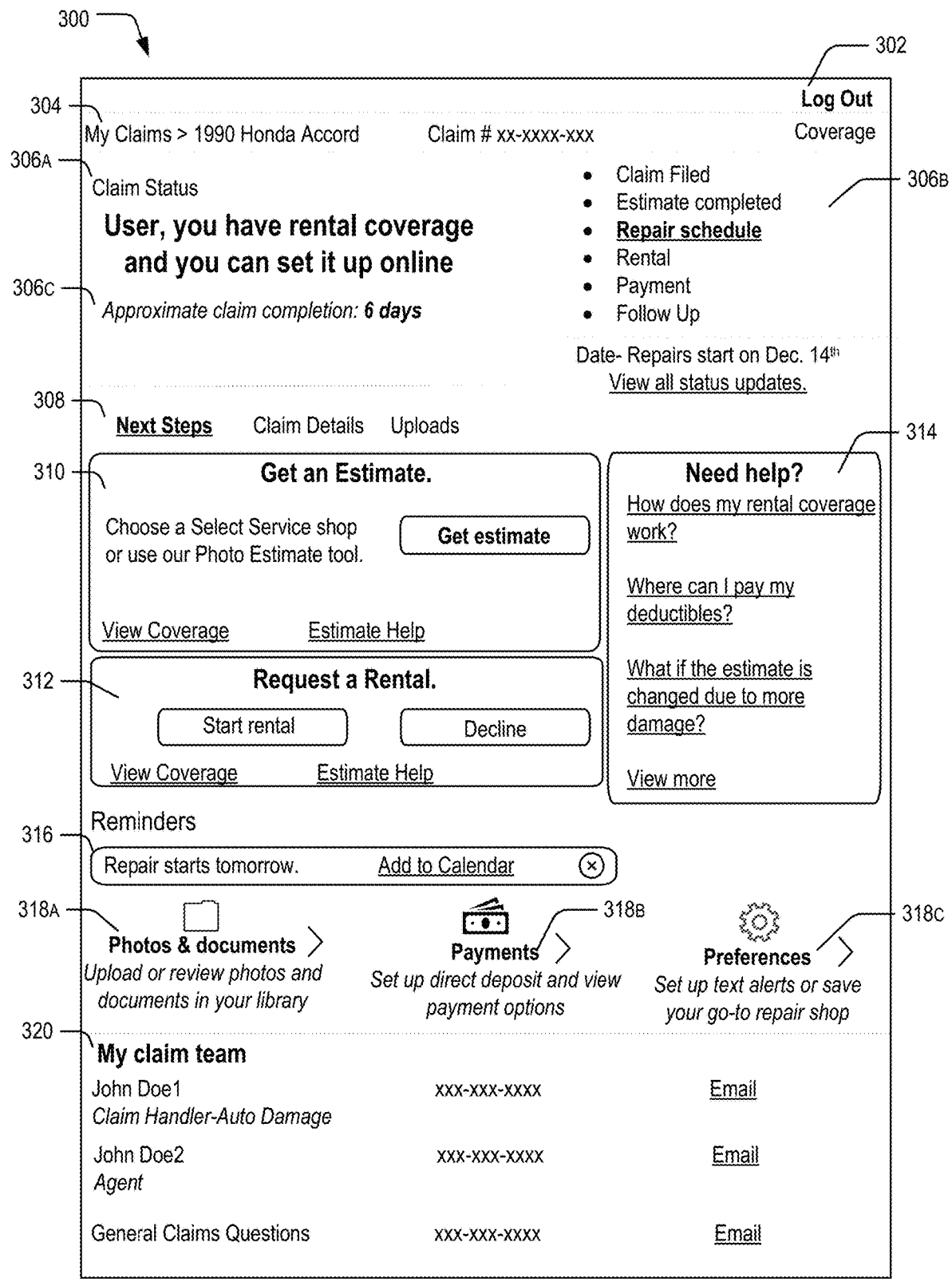
FIG. 3 illustrates an example user interface in accordance with some examples of the present disclosure.

FIG. 3 illustrates an example dynamic user interface 300 in accordance with some embodiments of the present disclosure. In some examples, user interface 300 is displayed after a user logs into and/or creates a user account with the service provider system 102, as described in FIGS. 2A and 2B above. For example, user interface 300 can be displayed after the user provides security credentials (e.g., username, password, etc.) in order to log into an account associated with the service provider system 102. In some examples, the security credentials correspond to a user identifier. As described above, when the user logs into an account associated with the service provider system 102 (or creates an account associated with the service provider system 102), a security token can be generated. This security token can be associated with a second authentication level (e.g., indicating the user is fully authenticated). The processors 106 can receive the security token associated with the second authentication level and/or the user identifier as input and access user information associated with the user identifier (or security credentials) from data store 104 based on the security level. The processors 106 can then use the user information to generate and cause user interface 300 to be displayed. In some examples, user interface 300 may User interface 300 may include exit element 302 (e.g., "Log Out"), that is selectable by the user to return to the user interface 200a of FIG. 2A or the user interface 200b of FIG. 2B. In some examples, selection of the exit element 302 may route the user to another user interface associated with the service provider system 102.

User interface 300 may include claim information 304, that is personalized to the user. In some examples the claim information 304 can be personalized based on user information associated with the user. In some examples, the user information can be associated with a user account of the user and stored in the data store 104.

In some examples, user interface 300 includes status elements 306a-306c that are personalized to the user and where the user is in the claim process. In some examples, a first status element 306a corresponds to a welcome message that is displayed to the user upon logging into a user's account with the service provider system 102. The first status element 306a can be customized based on what step and/or stage of a claim process is currently associated with the user. The first status element 306a can additionally or alternatively be personalized based on user information associated with the user. In some examples, the user information can be associated with the user account of the user and can be stored in the data store 104.

In some examples, a second status element 306b corresponds to a visual representation of what stage of the claim process is currently associated with the user. In some examples, the second status element 306b may include one or more steps in a claim process (e.g., claim files, estimate, repair and rental, payment, and/or follow up). The second status element 306*b* may include one or more visual indicia of emphasis (e.g., highlight, underline, bold, italicize, change color, etc.) one or more steps in the claim process to visually indicate which step currently corresponds to the user's claim. As an example, the second status element 306*b* may include visual indicia of emphasis, such as bolded and underlined text, corresponding to the "repair schedule" step, as shown in user interface 300. The second status element 306*b* may additionally add text indicating which step is "in progress," as shown in user interface 300.

In some examples, a third status element 306*c* corresponds to a time estimate associated with completing the user's claim. The third status element 306*c* can be customized and/or personalized based on user information associated with the user. The user information can be associated with the user account of the user. In some examples, the third status element 306*c* can additionally or alternatively be customized based on third-party information (e.g., information received from third-party system(s)) related to the user's claim. The user information and/or the third-party information can be stored in the data store 104.

In some examples, status elements 306*a*-306*c* can be updated dynamically and may be updated in real-time based on new information the service provider system 102 receives in relation to the user's claim. In some examples, the new information may be received from a claim handler and/or a third-party system 116 (e.g., repair shop, rental, hotel, etc.). For instance, the new information may be received by the service provider system 102 from a first API associated with the third-party system and/or a second API associated with the claim handler. In some examples, the claim handler corresponds to an insurance agent assigned to the user's claim.

User interface 300 may include selectable fields 308. In some examples, the selectable fields 308 may correspond to "next steps," "claim details," and/or "uploads." In some examples, the user can select "next steps." The processors 106 can receive the user's selection as input and, in response, can cause the user interface to display one or more options (e.g., linked elements 310 and/or 312). In some examples, the one or more options are customized based on where the user is in the claims process. Additionally or alternatively, the one or more options are customized based on the type of claim the user is filing. For instance, the one or more options displayed for an automobile insurance claim may be different from the one or more options displayed for a fire insurance claim, a home insurance claims, and/or a rental insurance claim. In some examples, the user interface 300 does not include selectable fields 308. Instead, the processors 106 may determine, based on where the user is at in the claims process, the one or more options to be displayed. For instance, the processors 106 may determine to include linked elements 310 and/or 312 as part of user interface 300. In this example, the user may select linked element 310 in order to get an estimate. In response, the processors 106 may cause user interface 300 to update linked element 310 to display information associated with one or more next steps. For instance, linked element 310 may display information associated with "claim details," an estimate, an action needed by the user, "uploads", or any other information described herein.

In some examples, the user can select "claim details." The processors 106 can receive the user's selection as input and, in response, can cause the user interface to display current activities associated with the user's claims. As an example, if the user has scheduled activities associated with a claim (e.g., repair of an automobile, rental, hotel stay, etc.), activity information associated with each activity will be displayed in response to the user selecting "claim details." In some examples, the activity information is selectable by the user and allows the user to make changes to the activity. As an example, where the activity information corresponds to a scheduled automobile repair, the activity information may include a selectable link that can be selected by the user. The processors 106 can receive the user's selection as input and, in response, can cause the user interface 200*b* to display one or more option(s) for the user to make changes to a location, date, time, etc. of the repair. In some examples, if the activities associated with the claim have been completed, the user interface may display an activity message indicating there is no activity information to currently display.

In some examples, the user can select "uploads." The processors 106 receive the user's selection as input and, in response, can cause the user interface to display an interface element for the user to upload one or more files (e.g., documents, photos, etc.). In some examples, the uploaded files are stored in the data store 104. In some examples, uploaded files are not viewable by the user unless the user is logged into a user account associated with the service provider system 102. In this way, the digital claims platform enables users to provide information pertinent to the claims process, while still protecting sensitive user information.

In some examples, user interface 300 first linked element 310, associated with obtaining a claim estimate. In some examples, the first linked element 310 is displayed based on where the user is in the claim process. As an example, the first linked element 310 can be displayed when the user is at the "estimate" stage of the claim process. In some examples, the first linked element 310 may include one or more visual indicia of emphasis. For instance, the first linked element 310 may include text that is bolded, highlighted, or otherwise emphasized to indicate that the first linked element 310 corresponds to the stage of the claims process currently associated with the user. If the user is not at the "estimate" stage, then the first linked element 310 may not be displayed on the user interface 200*a*.

In some examples, the first linked element 310 includes one or more selectable control(s) that can be selected by the user. The processors 106 receive the user's selection as input and, in response, can cause the user interface 300 to display an option for the user to select a first service (e.g., receive an estimate, select a repair shop, etc.) related to obtaining the claim estimate. As an example, where the claim filed corresponds to an automobile insurance claim, the selectable control of the first linked element 310 may allow the user to search and/or select a repair shop to receive a claim estimate from. Additionally or alternatively, the first linked element 310 may include additional selectable option(s) that can be selected by the user to display claim coverage associated with the user's insurance claim (e.g., denoted as "view coverage") and/or receive help related to the insurance claim (e.g., denoted as "estimate help").

In some examples, user interface 300 includes a second linked element 312. In some examples, the second linked element 312 can be selected by the user. The processors 106 receive the user's selection as input and, in response, can cause the user interface 300 to display an option for the user to request a second service (e.g., an automobile rental, hotel room reservation, etc.) related to the user's insurance claim. As an example, where the claim filed corresponds to an automobile insurance claim, the selectable control of the second linked element 312 may allow the user to search for, select, and/or reserve a rental car. In some examples, the second linked element 312 may include one or more selectable control(s) that can be selected by the user. The processors 106 receive the user's selection as input and, in response, can cause the user interface 300 to display an option for the user to accept and/or decline the second service related to the user's insurance claim. As an example, the user may accept and/or decline a car rental via the one or more selectable control(s). Additionally or alternatively, the second linked element 312 may include additional selectable option(s) that can be selected by the user to view claim coverage associated with the user's insurance claim (e.g., denoted as "view coverage") and/or receive help related to the insurance claim (e.g., denoted as "estimate help"). That is, user interface 300 provides an integrated user interface that is personalized the user, such that the user is provided with personalized, selectable controls (e.g., first linked element and/or second linked element). Accordingly, the digital claims platform provides an integrated and wholistic user experience, such that the user can handle anything related to an insurance claim in a single place.

User interface 300 may also include one or more linked content 314 (in this case, denoted by "Need help") that are selectable by the user to provide the user with additional information about the claims process. In some examples, the linked content 314 can be updated to reflect topics associated with where the user is in the claims process. As an example, if the user is at the "repair schedule" stage of filing a claim, linked content 314 may display one or more topics (e.g., questions and answers) corresponding to help topics specific to the "payment" stage of filing the claim. Accordingly, the user interface can be customized such that the user is provided with information pertinent to the current stage of the claims process that is associated with the user. This provides the user with a more guided and intuitive user experience.

In some examples, user interface 300 may include notification element 316. In some examples, notification element 316 corresponds to notifying the user of activities associated with the user's claim and/or claim process. As an example and not by way of limitation, where the user has a repair scheduled, the notification element 316 may display a reminder indicating when the repair is scheduled for. In some examples, the notification element 316 includes selectable option(s) that can be selected by the user. The processors 106 receive the user's selection as input and, in response, can cause the user interface 300 to display an option for the user to add the activity to a third-party integration (e.g., calendar, email, etc.). Additionally or alternatively, the notification element 316 may include an exit option (denoted as "x"), that enables the user to remove the notification element from the user interface 300.

User interface 300 may include interface elements 318a-318c. In some examples, a first interface element 318a includes a selectable control that can be selected by the user. The processors 106 receive the user's selection as input and, in response, can cause the user interface 300 to display an option for the user to upload and/or review one or more files (e.g., documents, photos, etc.). In some examples, the uploaded files are stored in the data store 104 and associated with the user's account. For instance, the option displayed to the user can be customized based on information associated with the user's account, such as the type of claim being filed by the user and/or where the user is in the claims process. As an example, the user may be filing an automobile claim. Based at least in part on the claim being related to an automobile, the processors 106 may determine that the user will need to file a police report. In this example, the processors 106 may cause the first interface element to display an option that includes text requesting the user to upload a police report associated with the insurance claim. In this way the user interface can be dynamically customized to the user and provide a proactive and guided user experience that is personalized to the user.

In some examples, user interface 300 includes a second interface element 318b. In some examples, a first interface element 318b includes a selectable control that can be selected by the user. The processors 106 receive the user's selection as input and, in response, can cause the user interface 300 to display an option for the user to view payment options and/or provide banking information (e.g., for direct deposit, etc.).

In some examples, user interface 300 includes a third interface element 318c. In some examples, the third interface element 318c includes a selectable control that can be selected by the user. The processors 106 receive the user's selection as input and, in response, can cause the user interface 300 to display an option for the user to access, set, and/or update one or more user preferences. In some examples, the selectable control of the third interface element 318c may also allow the user to access, set, and/or modify preferences associated with an identifier of the user. In some examples, the identifier of the user can be stored in data store 104 and can be associated with a corresponding user account of the user.

In some examples, the user preferences are stored in the data store 104 and associated with a user account of the user. As an example, the user can save preferences related to preferred automobile repair shops, preferred hotels, preferred rental companies, notification preferences, communication (e.g., text, email, etc.), or the like. As an example, the digital claims platform is able to utilize the user preferences in order to provide the user with an integrated and tailored experience. For instance, a user may save their preferred automobile repair shop they use when there are issues with their automobile. When the user files an automobile claim related to that automobile, the user's preferred shop can be suggested when the user selects "get estimate" as part of interface element 310.

User interface 300 may also include claim team information 320. In some examples, the claims team information 320 may include one or more of agent (e.g., claim handler) name(s), agent phone number(s), agent license number(s), agent website(s), team(s) assigned to handle the claim, team phone number(s), team website(s), general question email, etc.

Figure 4:
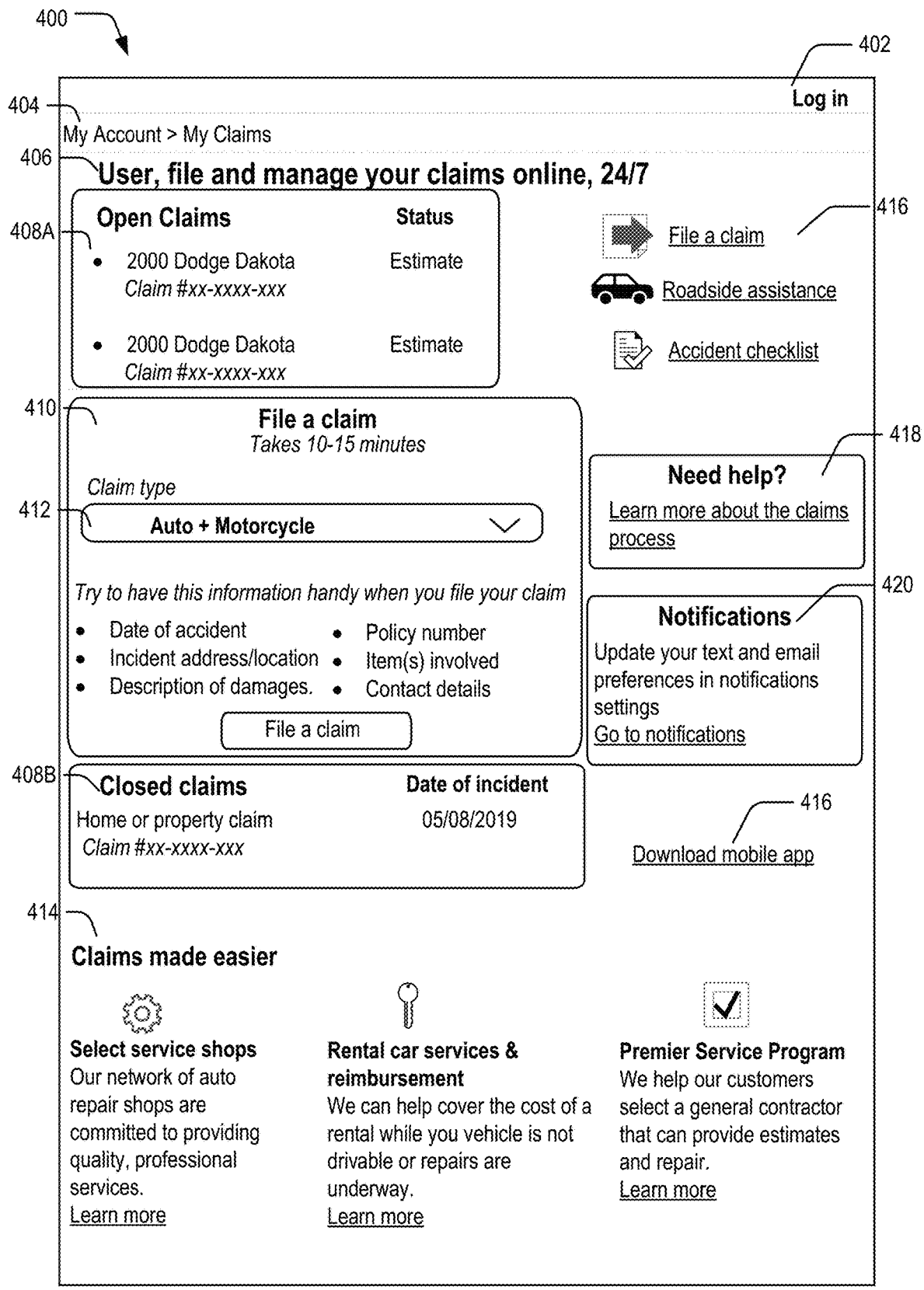
FIG. 4 illustrates an example user interface in accordance with some examples of the present disclosure.

FIG. 4 illustrates an example dynamic user interface 400 in accordance with some embodiments of the present disclosure. In some examples, user interface 400 is displayed when a user accesses a web page associated with the service provider system 102. In some examples, the user interface 400 is displayed in association with user interface 200a, user interface 200b, or user interface 300. As illustrated in FIG. 4, user interface 400 may include a log in link 402. The log in link 402 is selectable and enables a user to access an account associated with the service provider system 102 by providing security credentials (e.g., username, password, etc.). In some examples, user interface 400 comprises a page associated with a user's claims. For instance, where the user has multiple claims associated with a user account, user interface 400 may include information associated with each open claim, closed claim, etc. In some examples, user interface 400 is rendered based on a pre-defined template User interface 400 may also include account information 404. Account information may be associated with an account of the user and based at least in part on the security token generated when the user accesses the user interface 400. In some examples, one or more of the "my account" and/or "my claims" fields included in the user interface 400 may comprise selectable links that a user may select to access information associated with the user account.

User interface 400 may also include a welcome message 406. As illustrated, in some examples, the welcome message 406 may be personalized to a user and/or based on where a user is in the claims process.

User interface 400 may also include a first claim information card 408*a*. The first claim information card 408*a* may be associated with open claim information. For instance, where the user has multiple automobile insurance claims open, the information associated with each open claim may be displayed in the first claim information card 408*a*. As illustrated in FIG. 4, the first claim information card 408*a* may also indicate a status associated with each open claim. In some examples, that first claim information card may include a visual representation of where the user's claim is in the claim process. For instance, the "status" information may include and/or otherwise identify one or more steps in a claim process (e.g., claim filed, estimate, repair and rental, payment, and/or follow up).

User interface 400 may also include a second claim information card 408*b*. The second claim information card 408*b* may comprise information associated with closed claims. The closed claims may correspond to the user's account. As illustrated in FIG. 4, the second claim information card 408*b* may include information about the type of claim (e.g., home, automobile, fire, etc.), a unique claim number associated with a claim, and/or a date associated with the claim (e.g., such as when the incident occurred, when the claim was filed, when the claim was closed, or any other relevant date).

User interface 400 may also include a file claim card 410. The file claim card 410 may include selectable elements that enable a user to begin the process of filing an insurance claim. In some examples, the file a claim card 410 may include general information associated with filing a claim (e.g., such as how long it takes to file a claim, information associated with what a user may need to file a claim, etc.). In some examples, the file a claim card 410 includes a selectable element 412 that a user can select in order to pick a type of insurance. For instance, the selectable element 412 may comprise a drop down menu listing various types of insurance (e.g., auto and motorcycle, fire, home, or any other type of insurance coverage) that are available to the user and/or associated with the user's account. The file a claim card 410 may further comprise a link (e.g., illustrated as "file a claim" button), that a user can select in order to begin the claim filing process.

User interface 400 may also include a service information 414 element. In some examples, the service information element 414 may comprise information associated with one or more service(s) associated with the service provider system 102. In some examples, the service information element 414 includes visual elements associated with one or more service(s). For instance, as illustrated in FIG. 4, the service information element includes first information associated with "select service shops", a first visual element associated with the first information (e.g., the "tools" icon), and a first selectable link that a user may select in order to "learn more" about the first information.

User interface 400 may also include one or more selectable links 416. As illustrated in FIG. 4, the selectable links may comprise URLs that a user may select to access one or more additional user interface(s) associated with the service provider system 102. For instance, a user may select "file a claim" in order to access a user interface associated with filing an insurance claim. A user may select "roadside assistance" in order to access a user interface associated with requesting and/or learning more about roadside assistance. A user may select "accident checklist" in order to access a user interface and/or pdf associated with one or more item(s) corresponding to actions a user may take following an accident. A user may select "download mobile app" in order to access a user interface and/or application store and download an application associated with the service provider system 102. In some examples, the application may correspond to the application 114 and/or application 108 described above.

User interface 400 may also include a help card 418. The help card 418 may include linked content (e.g., denoted by "learn more about the claims process") that is selectable by the user to provide the user with additional information about the claims process. User interface 400 may also include a notifications card 420. The notifications card 420 may include linked content (e.g., denoted by "go to notifications") that a user may select in order to access settings associated with the user's notifications.

Figure 5A:
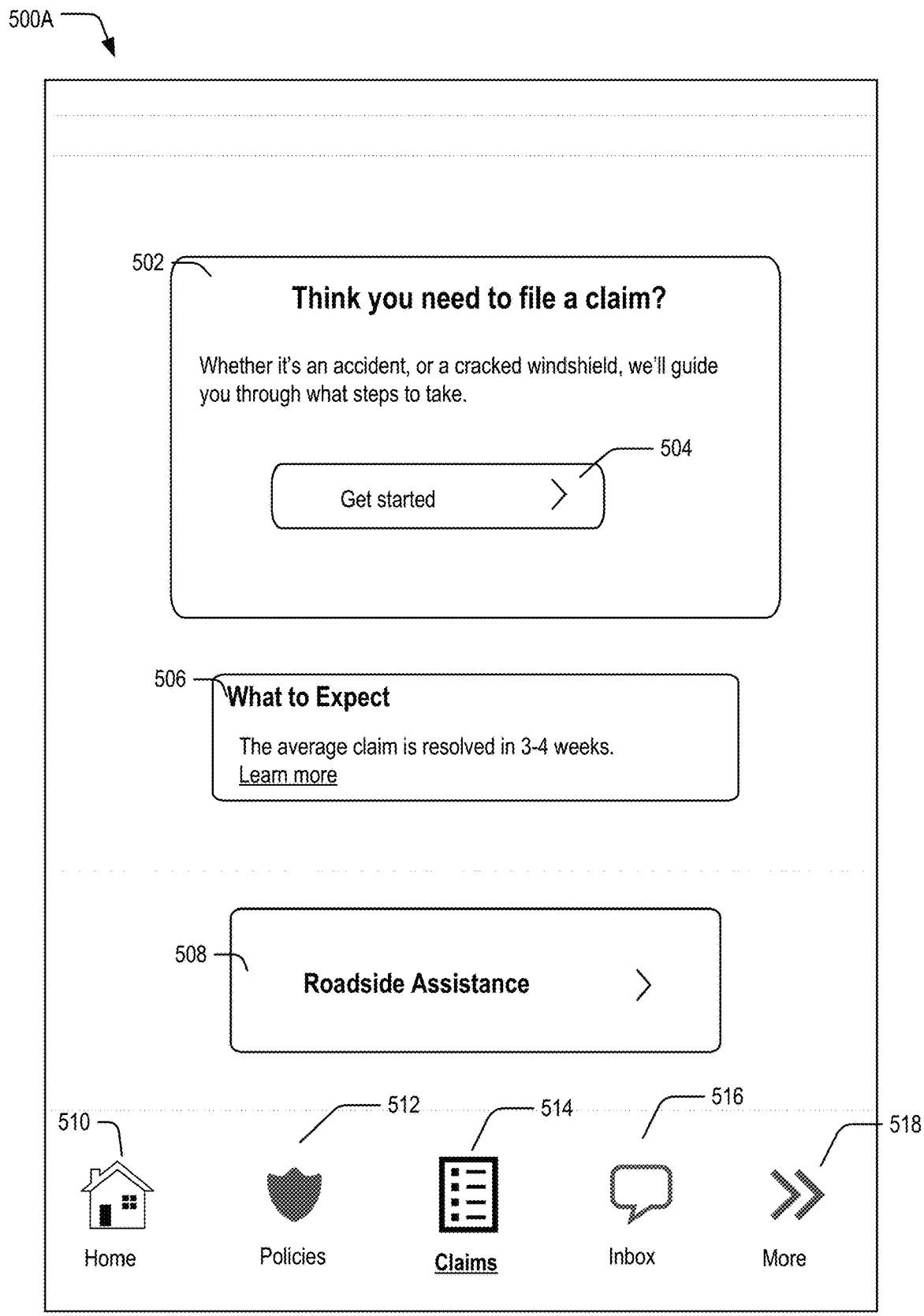
FIGS. 5A-5C illustrate an example user interface in accordance with some examples of the present disclosure.

FIG. 5A illustrates an example dynamic user interface 500*a* in accordance with some embodiments of the present disclosure. In some examples, the user interface 500*a* corresponds to an example interface of the application 114 on a computing device (e.g., computing device 112) associated with a user, which is displayed when the user initially accesses the application 114. For instance, in some examples, the application 114 may comprise a claims companion application, which may utilize machine learning mechanisms and/or artificial intelligence to automatically prefill claim information and generate recommendations personalized to a user.

Machine-learning mechanisms include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in memory associated with the server 112 and/or any other device described herein.

In some examples, the processors and/or application 114 may access one or more of the databases described herein. For instance, user interface 500*a* may be displayed in response to a user opening the application 114. In some examples, the user interface 500*a* includes a first interface element 502. As illustrated in FIG. 5A, the first user interface element may enable a user to begin the claim filing process. For instance, a user may select a "get started" option 504. The processors 106 may receive the user's selection as input and, in response, cause user interface 500*b* and/or 500*c* to be displayed. In some examples, the first user interface element 502 may include additional selectable options (not shown) that enable a user to upload media (e.g., photos, audio, video, etc.), select repair option(s), and/or request a virtual estimate.

User interface 500*a* also includes a second user interface element 506 (denoted as "What to Expect"), which may provide a user with additional information regarding the claims process described above. In some examples, the second user interface element 506 includes a selectable link (denoted as "learn more"), which a user can select to learn more above the claims process.

User interface 500a may also include a third user interface element 508. The third user interface element 508 may be selectable by the user. For instance, the processors 106 may receive the user's selection as input and, in response, cause a user interface associated with roadside assistance to be displayed.

User interface 500a may also include selectable elements 510, 512, 514, 516, and 518. The first selectable element 510 (denoted as "Home") may comprise a first icon that a user may select to return to a home screen (e.g., such as user interface 500a) within the application 114. The second selectable element 512 (denoted as "Policies") may be selected by a user to access one or more policies associated with a user account of the user. For instance, the processors 106 may receive the user's selection as input and, in response, identify one or more policies associated with the user. The one or more policies may be based on a user identifier associated with the user and/or a security token generated when the user opens the application 114. The third selectable element 514 (denoted as "Claims") may enable a user to access the dynamic user interface 500a described herein. As illustrated, the user interface 500a may include visual indicia (e.g., bolding, underlining, changing color, etc.) emphasizing which selectable element the user interface 500a is displaying. The fourth selectable element 516 (denoted as "Inbox") may be selected by the user to access messages between the user and the service provider system 102. The fifth selectable element 518 (denoted as "More") may be selected by a user to access any additional functionality provided by the service provider system 102. For instance, the user may select the fifth selectable element to access functionalities including virtual estimates, online loss reporting, repair options, etc.

Figure 5B:
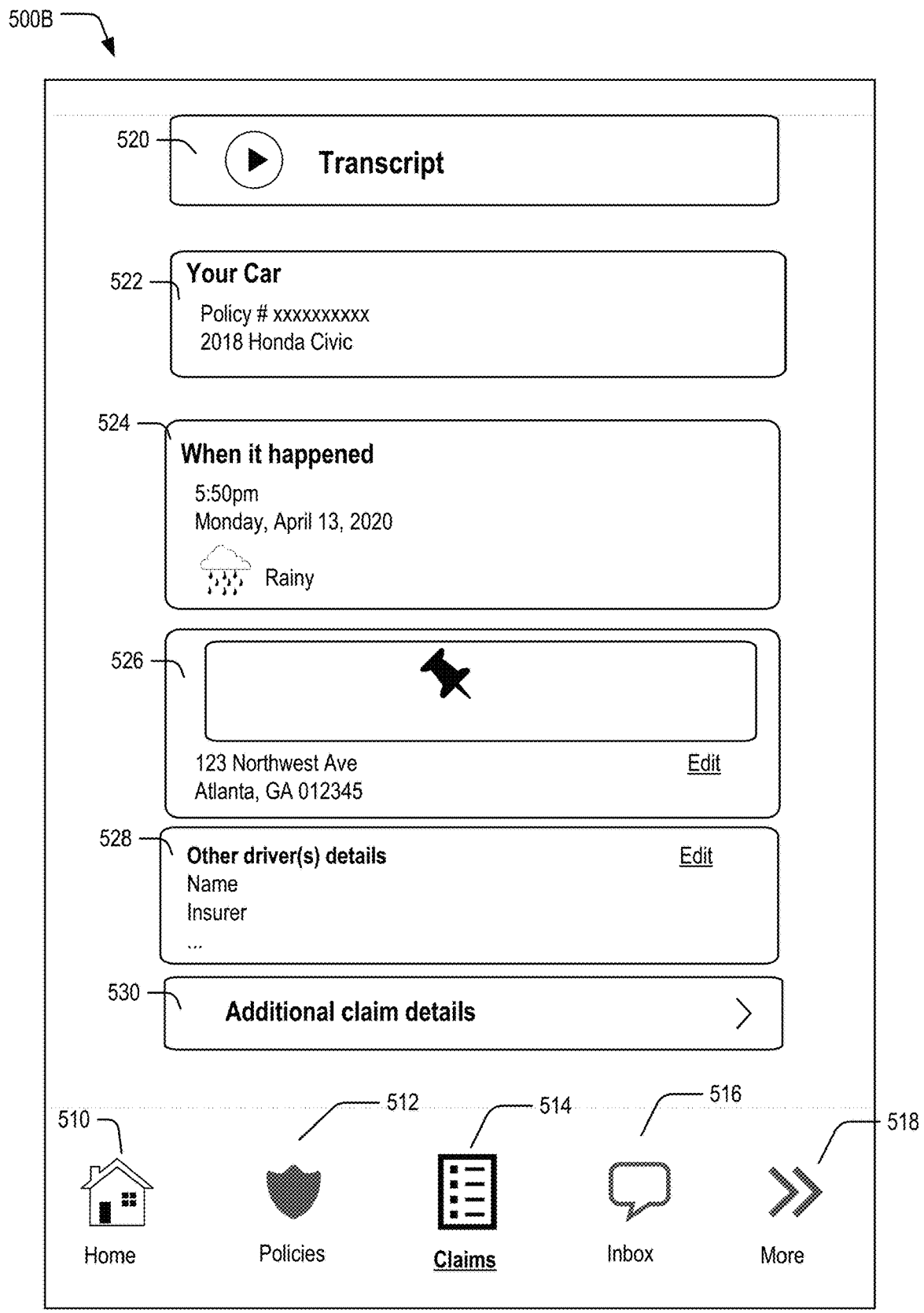

FIG. 5B illustrates an example dynamic user interface 500b in accordance with some embodiments of the present disclosure. In some examples, the processors 106 cause user interface 500b to be displayed in response to receiving input indicating a user has selected "get started" 506 on user interface 500a. In some examples, user interface 500b is generated automatically and without the user providing additional input. For instance, user interface 500b may be generated using machine learning mechanisms described above. For instance, when the user opens the application 114, the processors 106 may determine user information comprising one or more of: a location of the user, a policy associated with the user, a time and date associated with when the application 114 is accessed, media previously uploaded by the user and/or stored in the user's device (e.g., such as a mobile device of the user), weather, details associated with other users and/or an incident, etc. In some examples, the processors 106 may determine the user information without user input. For instance, the processors 106 may determine the user information and automatically prefill the claim information displayed on user interface 500b. In other examples, the processors 106 receive at least a portion of the user information as input, such as via one or more user interfaces. As illustrated, user interface 500b includes selectable element 510, 512, 514, 516, and 518 described with regard to user interface 500a above.

User interface 500b also includes a first interface element 520 (denoted as "Transcript"), which corresponds to media associated with a user's claim. For instance, the first interface element 520 may comprise photos, video, audio, etc. In some examples, the first interface element 520 is uploaded by a user at a previous time.

User interface 500b may also include a second interface element 522. The second interface element 522 may display information associated with the user's insurance policy. For instance, as illustrated in FIG. 5B, the second interface element 522 may include information about a user's car, insurance policy number, and/or any other relevant policy information. In some examples, the processors 106 may access the policy information from the data store 104 associated with the service provider system 102.

User interface 500b may also include a third interface element 524 (denoted as "when it happened). The third interface element 524 may comprise date information associated with an event (e.g., such as an incident corresponding to an insurance claim). For instance, the date information may comprise a time of the incident, a date of the incident, and/or weather associated with the time, date, and location. In some examples, the processors 106 receive the date information from the application 114 when a user opens the application 114.

User interface 500b may also include a fourth interface element 526. The fourth interface element 526 may comprise location information associated with the incident. For instance, the fourth interface element 526 may include a visual indication of a map with a pin marking where the incident occurred. The fourth interface element 526 may further include an address associated with the location of the incident. The fourth interface element 526 may also include a selectable link (denoted as "edit"), that a user can select to make changes to the location information. In some examples, the processors 106 may receive the location information from the application 114 when the user accesses the application 114. In other examples, the user may provide input indicating the location information and/or confirming the location information.

User interface 500b may also include a fifth interface element 528 (denoted as "Other driver(s) details"). The fifth interface element 528 may comprise other information associated with other people involved in an incident. For instance, where the incident comprises an automobile accident, the other information may comprise information associated with a person in another vehicle involved in the incident. The other information may also comprise insurance information associated with the other person. In some examples, the processors 106 determine the other information based on accessing photos from a user's photo library on the user device (e.g., computing device 112) and/or photos previously uploaded by the user. The processors 106 may extract the other information and automatically populate the fifth interface element 528. The fifth interface element 528 may also include a selectable link (denoted as "edit"), that a user can select to make changes to the other information.

User interface 500b may also include a sixth interface element 530 (denoted as "Additional claim details"). The sixth interface element 530 may be selectable by the user. The processors 106 may receive the selection as input and, in response, cause the application 114 to display user interface 500c described below.

Figure 5C:
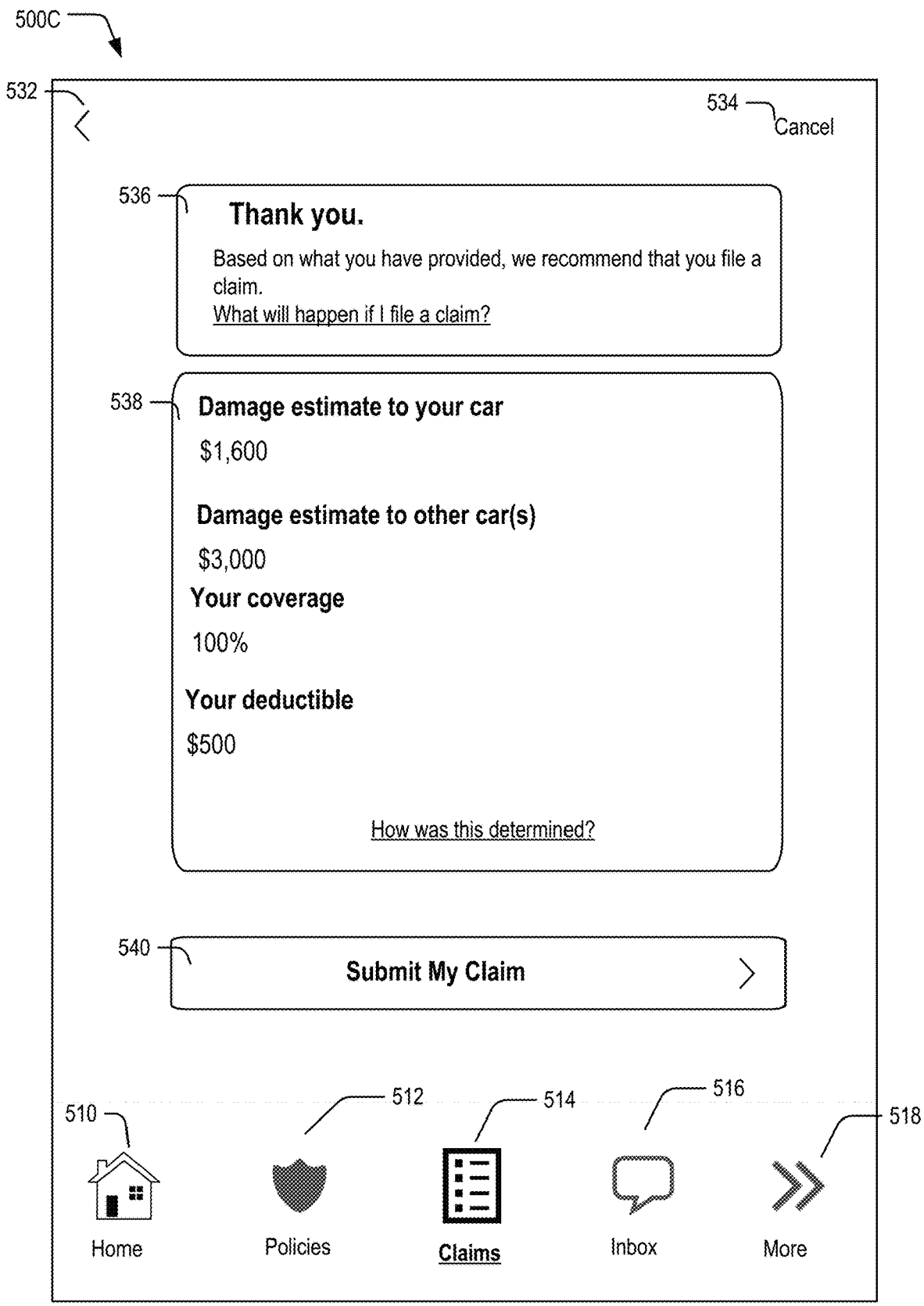

FIG. 5C illustrates an example dynamic user interface 500c in accordance with some embodiments of the present disclosure. In some examples, the processors 106 cause user interface 500c to be displayed in response to receiving input indicating a user has selected the sixth interface element 530 on user interface 500b. As illustrated, user interface 500c may include selectable element 510, 512, 514, 516, and 518 described with regard to user interface 500a and user interface 500b above.

User interface 500c may also include a first control 532 (denoted as an arrow), that is selectable by the user. The processors 106 may receive the selection of the first control 532 as input, and in response, cause the application to display user interface 500a, user interface 500b, and/or any other user interface described herein.

User interface 500c may also include a second control 534 (denoted as "cancel"), that is selectable by the user. The processors 106 may receive the selection of the first control 532 as input, and in response, cause the application to display user interface 500a, user interface 500b, and/or any other user interface described herein.

User interface may also include a first interface element 536. In some examples, the first interface element 536 comprises a recommendation associated with an incident. For instance, the first interface element 536 may comprise a recommendation that the user file a claim. In other examples, the first interface element 536 may comprise an indication that the user's claim is a total loss, an indication of potential repair options, estimate options (e.g., such as a virtual estimate provided by the service provider system 102 and/or third-party estimates provided by a third-party, when there is not a total loss), and/or payment options for the user (e.g., such as requesting how a user may want receive a payment in the event of a total loss). In some examples, the processors 106 may determine there is a total loss associated with a potential claim. For instance, where the claim is associated with an automobile coverage, the processors 106 may determine a total loss exists where an estimated cost of repair to the vehicle is greater than a value of the vehicle. The estimated cost of repair may be determined based on analyzing images and/or media associated with the vehicle to estimate damage. The value of the vehicle may be determined based on a market value (e.g., such as a Kelly Blue Book value associated with the vehicle).

User interface may also include a second interface element 538. The second interface element may comprise estimate information associated with the recommendation provided in the first interface element 536. For instance, the estimate information included in the second interface element 538 may comprise an estimate of the cost of damage, an estimate of a cost of damage to other property involved in the incident, coverage associated with the user, an amount of a deductible associated with the user, an amount the user may receive via a payment, an amount the user's property is valued at, and/or any other information that may be relevant to the recommendation. The second interface element 538 may also include a selectable link (denoted as "how was this determined"). The processors 106 may receive the selection of the selectable link as input and, in response, display a breakdown of the different estimates generated by the processors 106 and/or application 114.

User interface may also include a third interface element 540 (denoted as "submit my claim"). For instance, where the user wishes to submit a claim, the user may select the third interface element 540 to submit the information associated with user interface 500b and 500c for review by the service provider system 102.

Accordingly, user interfaces 500a, 500b, and 500c comprise dynamic user interfaces, where the processors 106 utilize media associated with a user (e.g., such as media previously uploaded by the user, associated with a user account, and/or accessed from third-party services (e.g., police reports, etc.)) to extract information and automatically prefill claims details with little or no user input. In this way, total loss identification and claim filing is streamlined, reducing the amount of input required from a user, and thereby reducing the number of messages sent between the application 114 and the service provider system 102, which may reduce the amount of traffic in the network 110.

Figure 6:
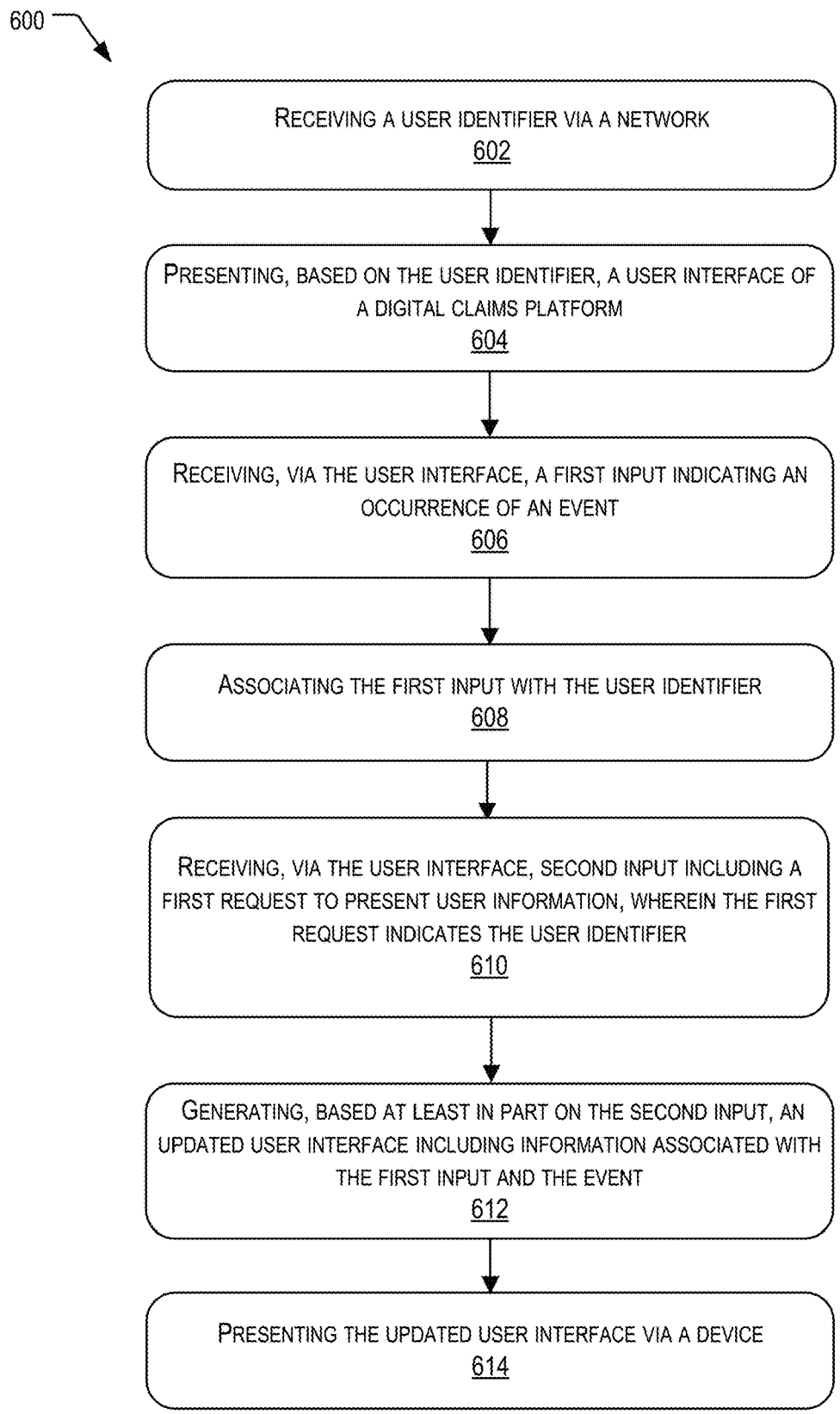
FIG. 6 illustrates an example process for implementing a dynamic and intuitive user interface of the digital claims platform, in accordance with some embodiments of the present disclosure.

FIG. 6 illustrates an example process 600 for implementing the digital claims platform, in accordance with some embodiments of the present disclosure. Various methods are described with reference to the example system 100 of FIG. 1 for convenience and ease of understanding. However, the methods described are not limited to being performed using the system 100 of FIG. 1 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods As shown in FIG. 6, at step 602, the processors 106 may receive a user identifier via a network 110. In some examples, the user identifier is received as part of a URL. In some examples, the user identifier is received when a user logs into a user account associated with the service provider system 102. In some examples, the user identifier is associated with a user account of the user that is associated with the service provider system 102.

At step 604, the processors may present, based on the user identifier, a user interface of a digital claims platform. In some examples, the user interface may correspond to one of user interface 200a, user interface 200b, user interface 300, user interface 400, user interface 500a, user interface 500b, or user interface 500c, described above in FIGS. 2A-5C. In some examples, the digital claims platform can be associated with an insurance provider. In some examples, the user interface is presented based at least in part on user information associated with the user identifier. For instance, one or more elements of the user interface (e.g., claim status, next steps, claim details, help topics, etc.) can be populated by the processors based at least in part on the user information the processors receive from one or more back-end services (e.g., API's, etc.).

At step 606, the processors 106 may receive, via the user interface, a first input indicating an occurrence of an event. In some examples, the event can correspond to an action associated with an insurance claim. As an example and not by way of limitation, the event may correspond to at least one of updating data associated with the user identifier, uploading file(s) (e.g., documents associated with the user identifier and/or images associated with the user identifier), selecting a help topic, or logging into an account associated with the user identifier. In some examples, the first input may be received from the user associated with the user identifier, a claim handler of an insurance provider, and/or a third-party user.

At step 608, the processors 106 may associate the first input with the user identifier. In some examples, the first input may be stored in association with the user identifier in data store 104.

At step 610, the processors 106 may receive, via the user interface, second input including a first request to present user information, wherein the first request indicates the user identifier. In some examples, the user information may correspond to one or more of user preferences (e.g., user notification preferences, user contact preferences, user repair preferences, user rental preferences, user lodging preferences, etc.), vehicle information, coverage information associated with a claim, status information associated with the claim, or agent information associated with the claim.

At step 612, the processors 106 may generate, based at least in part on the second input, an updated user interface including information associated with the first input and the event. In some examples, the information displayed on the updated user interface may be determined based at least in part on whether the user is logged into a user account associated with the user identifier.

In some examples, the processors 106 may access status information (e.g., information related to the user's claim, such as what step and/or stage of the claim process the user is currently at) associated with the user identifier. In some examples, the status information may be stored in data store 104. In some examples, the processors 106 may use the status information to determine whether or not to include the information as part of the updated user interface. As an example, if portion(s) of the information associated with the first input and the event does not correspond to the current step of the user's claim process, then the processors 106 may determine to not include the portion(s) that are not relevant to the user's current step in the claim process in the updated user interface. Accordingly, the digital claims platform is able to utilize logic to intelligently determine whether or not to display or hide information on the user interface, thereby giving the user a tailored and dynamic experience.

At step 614, the processors 106 may present the updated user interface. In some examples, the updated user interface may correspond to user interface 200b, described above with regard to FIG. 2B or any of the user interfaces described herein.

Figure 7:
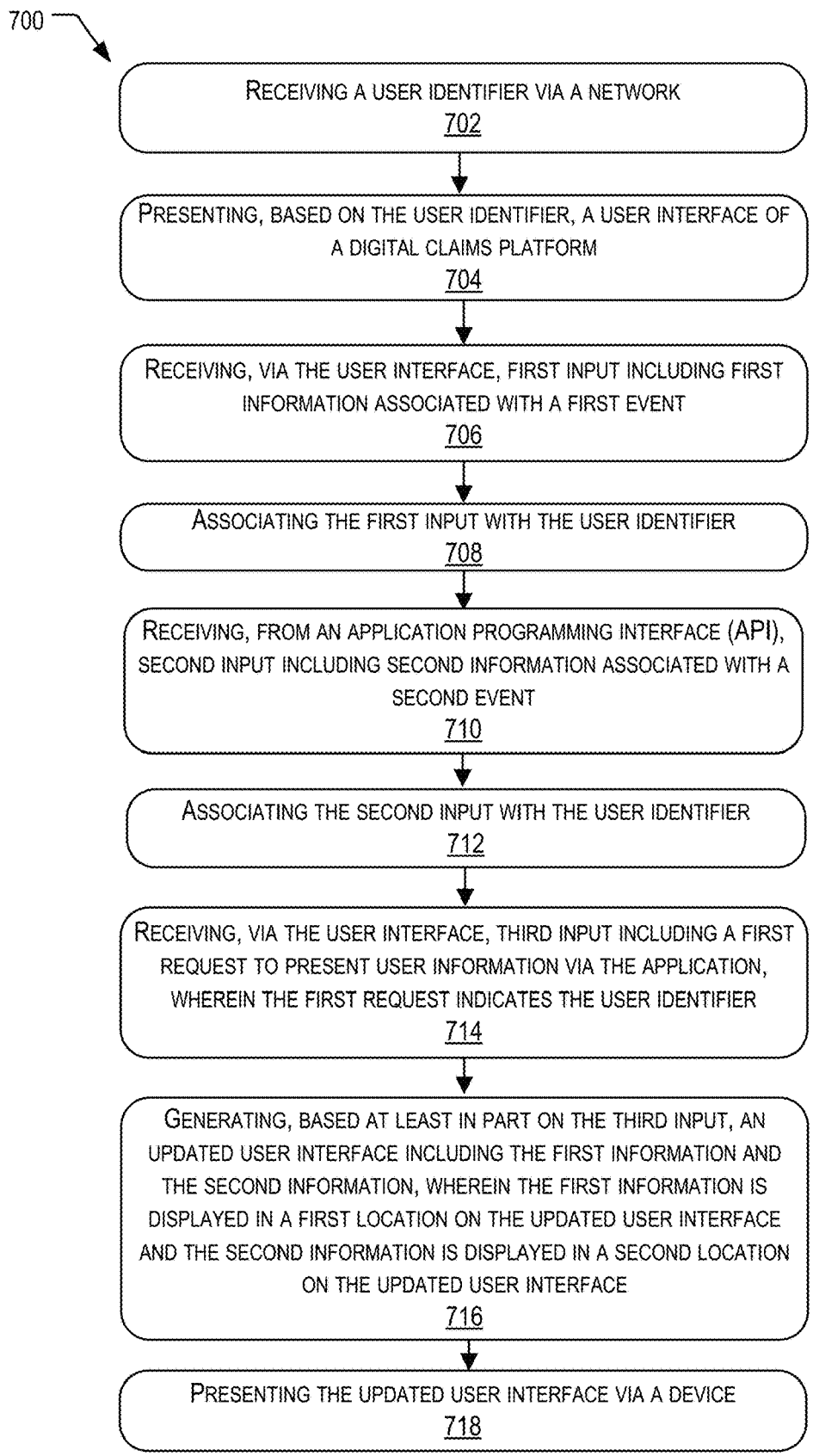
FIG. 7 illustrates an example process for implementing a dynamic and intuitive user interface of the digital claims platform, in accordance with some embodiments of the present disclosure.

FIG. 7 illustrates an example process 700 for implementing the digital claims platform, in accordance with some embodiments of the present disclosure. Various methods are described with reference to the example system 100 of FIG. 1 for convenience and ease of understanding. However, the methods described are not limited to being performed using the system 100 of FIG. 1 and may be implemented using systems and devices other than those described herein.

At step 702, the processors 106 may receive a user identifier via a network 110. In some examples, the user identifier is received as part of a URL. In some examples, the user identifier is received when a user logs into a user account associated with the service provider system 102. The user identifier can be associated with a user account of the user that is associated with the service provider system 102.

At step 704, the processors 106 may present, based on the user identifier, a user interface of a digital claims platform. In some examples, the user interface is presented based at least in part on user information associated with the user identifier. For instance, one or more elements of the user interface (e.g., claim status, next steps, claim details, help topics, etc.) can be populated by the processors based at least in part on the user information the processors receive from one or more back-end services (e.g., application programming interface(s) (API's), etc.).

At step 704, the processors 106 may receive, via the user interface, first input including first information associated with a first event. In some examples, the first input may be received from a user associated with the user identifier, a claim handler of an insurance provider, or a third-party user. In some examples, the first event may be associated with an activity related to an insurance claim of the user. In some examples, the first information may correspond to at least one of: user preferences, vehicle information, coverage information associated with a claim, status information associated with the claim, or agent information associated with the claim.

At step 706, the processors 106 may associate the first input with the user identifier. In some examples, the first input may be stored in association with the user identifier in data store 104.

At step 708, the processors 106 may receive, from an API, a second input including second information associated with a second event. In some examples, the API may be associated with a claim handler of the service provider system 102 and/or with a third-party system 116. In some examples, the second event may be associated with an activity related to an insurance claim of the user. In some examples, the second event may be associated with at least one of updating data associated with the user identifier, uploading documents associated with the user identifier, uploading images associated with the user identifier, selecting a help topic, or logging into an account associated with the user identifier. In some examples, the second information may be associated with at least one of: user preferences, vehicle information, coverage information associated with a claim, status information associated with the claim, or agent information associated with the claim.

At step 710, the processors 106 may associate the second input with the user identifier. In some examples, the second input may be stored in association with the user identifier in data store 104.

At step 712, the processors 106 may receive, via the user interface, third input including a first request to present user information, wherein the first request indicates the user identifier. In some examples, the first request to present the user information may be received from a user associated with the user identifier. For example, the user may initiate the first request by performing to one or more of: reloading the user interface, the user logging into a user account associated with the service provider system 102, or the like.

At step 714, the processors 106 may generate, based at least in part on the third input, an updated user interface including the first information and the second information, wherein the first information is displayed in a first location on the updated user interface and the second information is displayed in a second location on the updated user interface.

In some examples, the processors 106 may access status information (e.g., information related to the user's claim, such as what step and/or stage of the claim process is currently associated with the user)) associated with the user identifier. In some examples, the status information may be stored in data store 104. The processors 106 may use the status information to determine whether or not to include the first information and/or the second information as part of the updated user interface. For instance, if the status information indicates that the first information is associated with the current step and/or stage of the claim process associated with the user identifier, then the processors 106 may determine that the first information should be included as part of the updated user interface. Similarly, if the status information indicates that the first information is not associated with the current step and/or stage of the claim process associated with the user identifier (e.g., the first information is associated with a step and/or stage of the claim process that the user has completed and/or not reached yet), then the processors 106 may determine that the first information should not be included as part of the updated user interface. Accordingly, the digital claims platform is able to utilize logic to intelligently determine whether or not to display or hide information on the user interface, thereby giving the user a tailored and dynamic experience.

At step 716, the processors 106 may present the updated user interface. In some examples, the updated user interface may be presented via application 114.

It should be appreciated that the subject matter presented herein can be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations can be performed in combination with other types of program components. Generally, program components include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. While the configurations described herein are given in the context of a computing environment, such as an organization's network, the techniques described herein may also be applied to, without limitation, any context where a digital claim can be made.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system, comprising:
   one or more processors; and
   computer-readable media storing computer readable instructions that, when executed by the one or more processors, cause the one or more processors to perform operations comprising:
      receiving from a user computing device via a network, a request to display a user interface comprising a plurality of dynamic fields;
      determining that the user computing device is connected to the system using a session having a first authentication level, wherein establishing the first authentication level is achievable without a security token needed to establish a second authentication level;
      providing, from the user computing device and via the network, a first instruction to cause the user computing device to generate the user interface;
      receiving, via the network, a first signal indicative of an occurrence of a first event;
      determining first data based on the first signal;
      based on receiving the first signal, providing a second instruction to the user computing device via the network, the second instruction causing the user computing device to generate a first updated user interface presenting the first data;
      receiving, via the network, a second signal indicative of a second input received via the first updated user interface, the second input comprising an identifier unique to a user of the user computing device and a request to present information of the user;
      based on receiving the second signal, and using the identifier, obtaining second data comprising a plurality of updated values associated with the plurality of dynamic fields, wherein the plurality of updated values comprise a first value excluding information reserved for sessions associated with the second authentication level; and
      providing a third instruction to the user computing device via the network, the third instruction causing the user computing device to generate a second updated user interface based on the plurality of updated values.

2. The system of claim 1, wherein:
   the user interface represents that a processing task is at a first processing stage of a plurality of sequential processing stages, and
   the plurality of dynamic fields comprises one or more attributes of the user that correspond to the first processing stage.

3. The system of claim 1, the operations further comprising:
   determining that the user interface is presented using an active login session; and
   determining a subset of the second data, the subset excluding a confidential value in the second data, wherein the second updated user interface represents the subset.

4. The system of claim 1, wherein the first event represents an update in a first value, the first value representing an attribute of the identifier.

5. The system of claim 1, wherein the first event represents that a first document has been uploaded using an account associated with the user.

6. The system of claim 1, wherein the first event represents a change in a status of a processing task, the processing task being associated with the user.

7. The system of claim 1, wherein obtaining the second data comprises providing a request to an application programming interface (API) for a first software application, the first software application communicating with a second software application being executed on the user computing device.

8. The system of claim 7, wherein the first software application is executed on a backend system with a data storage platform, the data storage platform storing the second data.

9. A method comprising:
   receiving, by a processor and from a user computing device via a network, a request to display a user interface comprising a plurality of dynamic fields;

determining, by the processor, that the user computing device is connected to a system comprising the processor using a session having a first authentication level, wherein establishing the first authentication level is achievable without a security token needed to establish a second authentication level;

providing, by the processor and from the user computing device and via the network, a first instruction to cause the user computing device to generate the user interface;

receiving, by the processor and via the network, a first signal indicative of an occurrence of a first event;

determining, by the processor, first data based on the first signal;

based on receiving the first signal, providing, by the processor, a second instruction to the user computing device via the network, the second instruction causing the user computing device to generate a first updated user interface presenting the first data;

receiving, by the processor and via the network, a second signal indicative of a second input received via the first updated user interface, the second input comprising an identifier unique to a user of the user computing device and a request to present information of the user;

based on receiving the second signal, and using the identifier, obtaining, by the processor, second data comprising a plurality of updated values associated with the plurality of dynamic fields, wherein the plurality of updated values comprise a first value excluding information reserved for sessions associated with the second authentication level; and providing, by the processor, a third instruction to the user computing device via the network, the third instruction causing the user computing device to generate a second updated user interface based on the plurality of updated values.

10. The method of claim 9, wherein:
the user interface represents that a processing task is at a first processing stage of a plurality of sequential processing stages, and
the plurality of dynamic fields comprises one or more attributes of the user that correspond to the first processing stage.

11. The method of claim 9, further comprising:
determining that the user interface is presented using an active login session; and
determining a subset of the second data, the subset excluding a confidential value in the second data, wherein the second updated user interface represents the subset.

12. The method of claim 9, wherein the first event represents an update in a first value, the first value representing an attribute of the identifier.

13. The method of claim 9, wherein the first event represents that a first document has been uploaded using an account associated with the user.

14. The method of claim 9, wherein the first event represents a change in a status of a processing task, the processing task being associated with the user.

15. The method of claim 9, wherein obtaining the second data comprises providing a request to an application programming interface (API) for a first software application, the first software application communicating with a second software application being executed on the user computing device.

16. The method of claim 15, wherein the first software application is executed on a backend system with a data storage platform, the data storage platform storing the second data.

17. One or more non-transitory computer-readable media storing computer-executable instructions that, when executed by one or more processors, cause the one or more processors to perform operations comprising:
receiving, from a user computing device via a network, a request to display a user interface comprising a plurality of dynamic fields;
determining that the user computing device is connected to a system comprising the one or more processors using a session having a first authentication level, wherein establishing the first authentication level is achievable without a security token needed to establish a second authentication level:
providing, from the user computing device and via the network, a first instruction to cause the user computing device to generate the user interface;
receiving, via the network, a first signal indicative of an occurrence of a first event;
determining first data based on the first signal;
based on receiving the first signal, providing a second instruction to the user computing device via the network, the second instruction causing the user computing device to generate a first updated user interface presenting the first data;
receiving, via the network, a second signal indicative of a second input received via the first updated user interface, the second input comprising an identifier unique to a user of the user computing device and a request to present information of the user;
based on receiving the second signal, and using the identifier, obtaining second data comprising a plurality of updated values associated with the plurality of dynamic fields, wherein the plurality of updated values comprise a first value excluding information reserved for sessions associated with the second authentication level; and
providing a third instruction to the user computing device via the network, the third instruction causing the user computing device to generate a second updated user interface based on the plurality of updated values.

18. The one or more non-transitory computer-readable media of claim 17, wherein:
the user interface represents that a processing task is at a first processing stage of a plurality of sequential processing stages, and
the plurality of dynamic fields comprises one or more attributes of the user that correspond to the first processing stage.

19. The one or more non-transitory computer-readable media of claim 17, the operations further comprising:
determining that the user interface is presented using an active login session; and
determining a subset of the second data, the subset excluding a confidential value in the second data, wherein the second updated user interface represents the subset.

20. The one or more non-transitory computer-readable media of claim 17, wherein the first event represents an update in a first value, the first value representing an attribute of the identifier.

* * * * *